United States Patent

[11] 3,576,398

[72] Inventors Jacques Henri Dejean
Ris-Orangis;
Charles Henri Grandjean, Emile Villejuif;
Max Jean Pierre Leger, Paris, France

[21] Appl. No. 655,435
[22] Filed July 24, 1967
[45] Patented Apr. 27, 1971
[73] Assignee International Standard Electric Corporation New York, N.Y.
[32] Priority July 26, 1966
[33] France
[31] 70,951

[54] PATH HUNTING CIRCUIT IN A TELEPHONE NETWORK WITH A CENTRALIZED CONTROL UNIT
5 Claims, 24 Drawing Figs.

[52] U.S. Cl. .......... 179/18, 179/18(ES)
[51] Int. Cl. .......... H04q 3/54, H04q 3/56
[50] Field of Search .......... 179/18.211, 18.21, 18.3 (C) (Cursory), 15 (AT) (Cursory), 18 (SP)

[56] References Cited

UNITED STATES PATENTS 3,365,548 1/1968 Lucas et al. .......... 179/18(.211)

*Primary Examiner*—William C. Cooper
*Assistant Examiner*—Thomas W. Brown
*Attorneys*—C. Cornell Remsen, Jr., Rayson P. Morris, Percy P. Lantzy, J. Warren Whitesel, Phillip A. Weiss and Delbert P. Warner

ABSTRACT: A central data processor for controlling the switching of a call through a multiexchange network. A table is developed to list switching paths through the network in the order of their normal occupation level, their priority assignments, and their busy hour priority. Data from the tables are stored on a semipermanent memory. This memory controls the order of search for an idle path through the exchange and causes the lowest occupation level, nonpriority direct paths to be searched first and sequentially searching, if necessary, passes to higher occupation levels and then to indirect paths in the order set out on the developed tables.

PATH HUNTING CIRCUIT IN A TELEPHONE NETWORK WITH A CENTRALIZED CONTROL UNIT

The present invention concerns a circuit for trunk supervision and path hunting in a telecommunication network—a telephone network, for instance—comprising a certain number of central exchange offices controlled by a single centralized control unit.

In the design of central exchange offices equipped with electromechanical switches, the present trend consists in carrying out all the operations concerning a call and the setting up of a connection between a calling line and a called line by means of a centralized control circuit. The elementary operations are performed at a very high speed.

By way of example, such a telephone exchange has been described:

a. In the two issues of Sept. 1964 of the "Bell System Technical Journal," under the title "No. 1 Electronic Switching System;" this publication being referenced below as *a*.

b. In the issue of July—Aug. 1965 of the same journal, under the title "A Survey of Bell System Progress in Electronic Switching" (pages 939 to 997), this article being referenced below as *b*.

The centralization of the operations can still be increased by controlling all the central exchanges which constitute a network through a single "central processor," such as suggested in the article entitled "Flexible Routing Plans" published in pages 48 to 54 of the No. 1, Volume 41 of the Review "Electrical Communications." Most of the operations related to a call or to a connection may be carried out by means of this unit, which will be assumed to be sufficiently fast to process the network traffic.

The present invention concerns a path hunting circuit adapted to such a centralized control network which utilizes a flexible routing plan. This plan is built by taking into account the occupation level of the trunks connecting the different central exchanges of the network, the call time, the priority level of the subscribers, etc. ...

The object of the present invention is thus to realize a path hunting circuit for internal and outgoing calls originating in a telephone network controlled by a single control unit or "central processor."

Figures 1A, 1B, 1C, 1D, 1E, 1F, 1G, 1H, 1I, 1J, 1K, 1L, 1M, 1N, 1O, 1P:
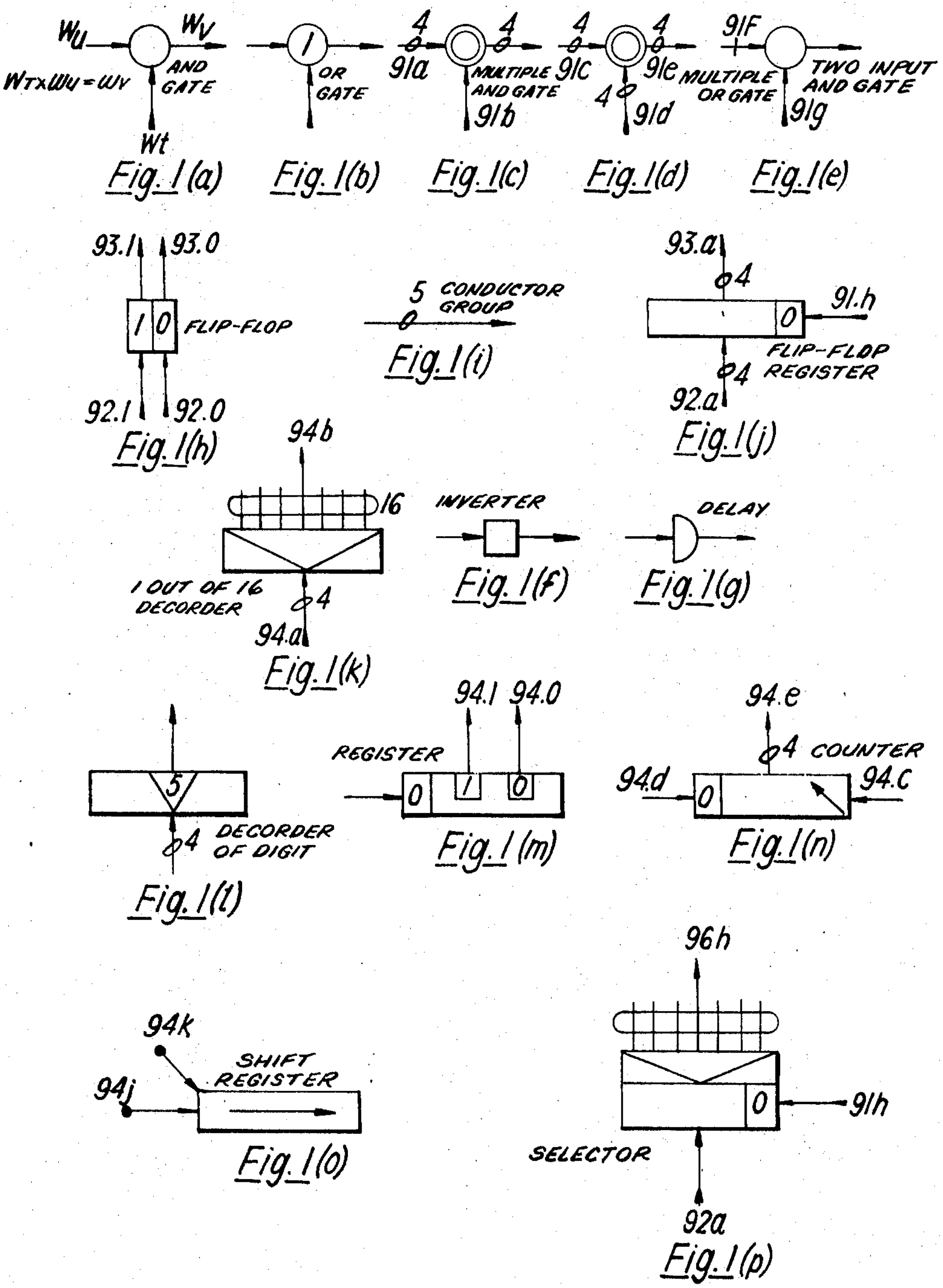
Figure 2:
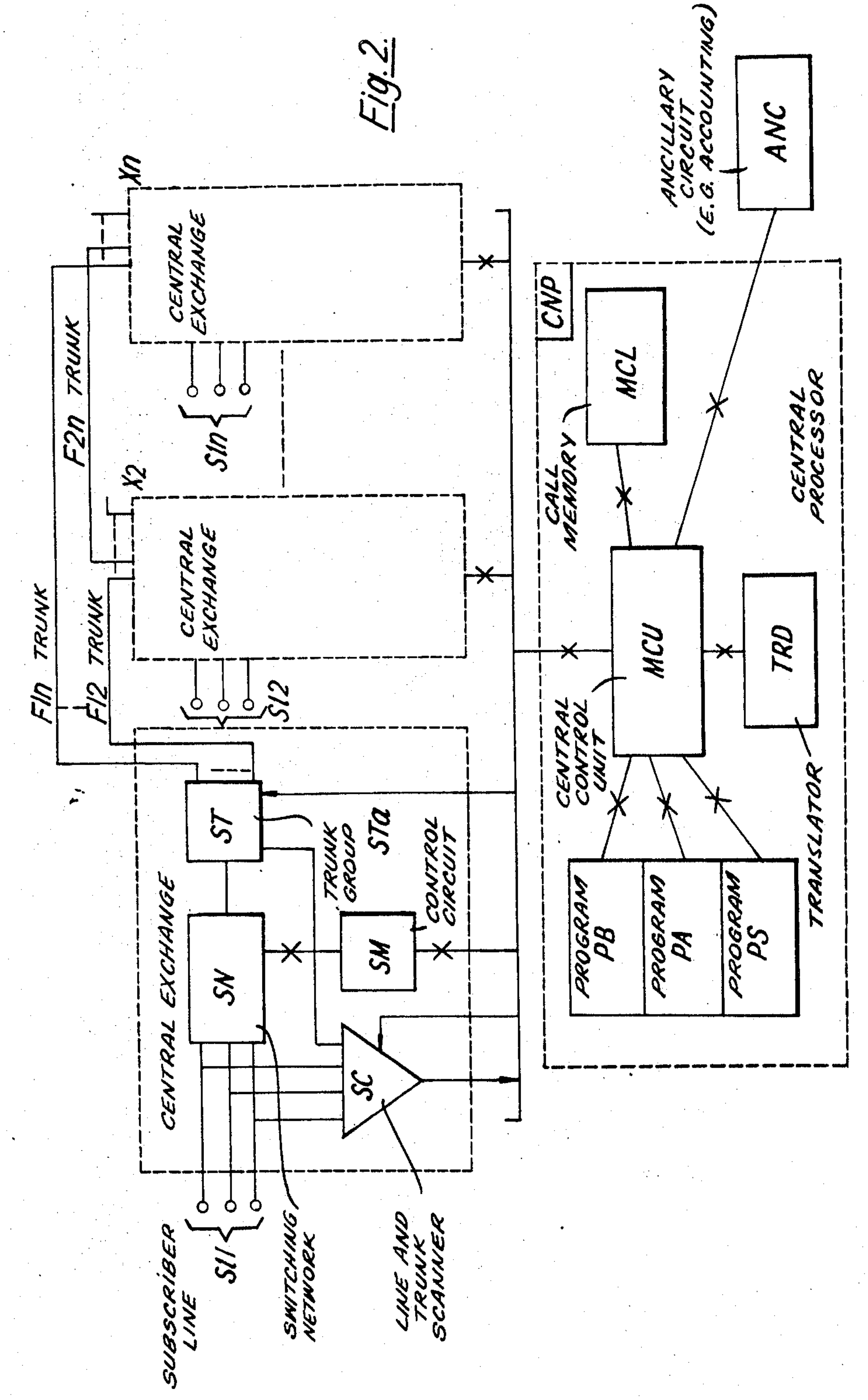
Figure 3:
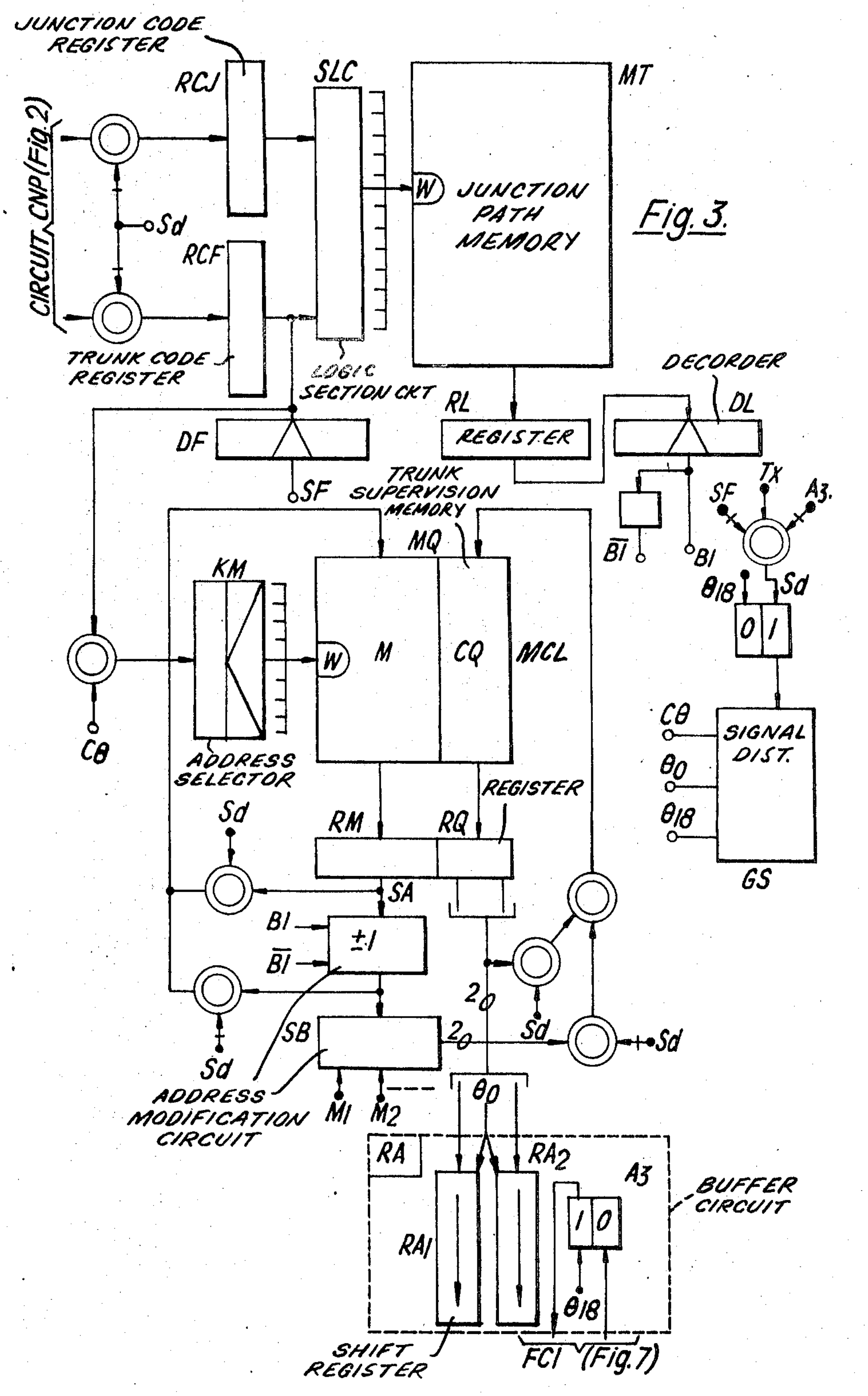
Figure 9:
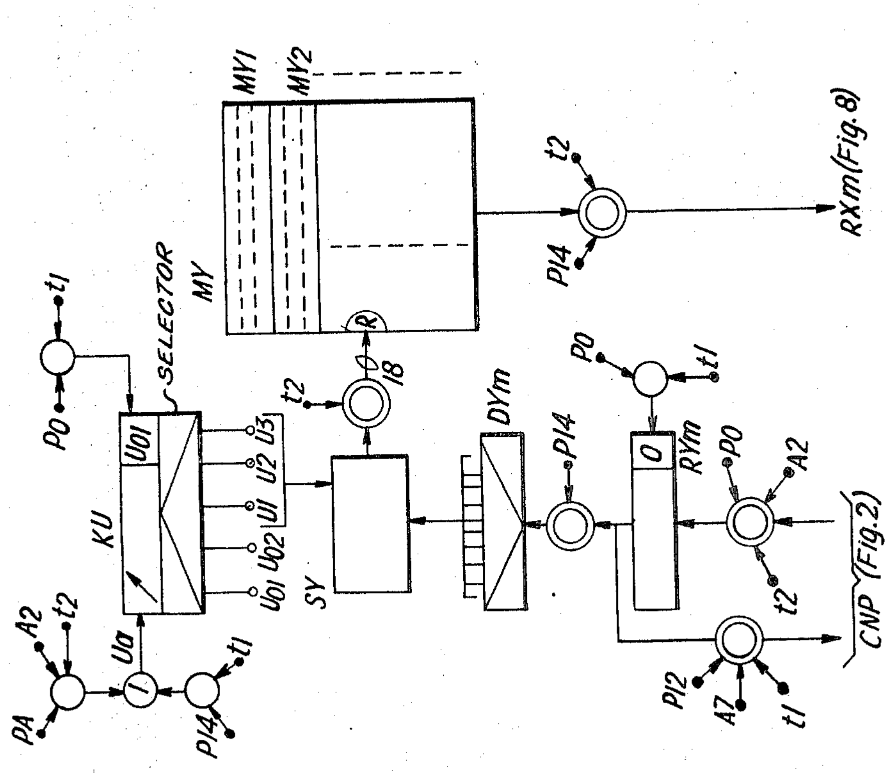
Figure 4:
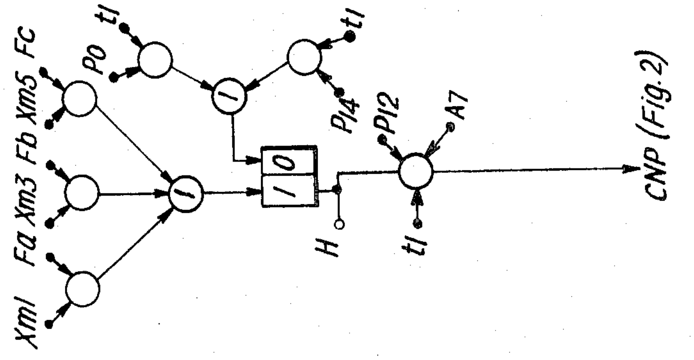
Figure 4:
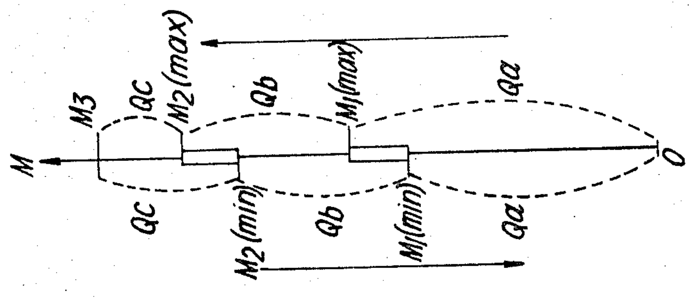
Figure 5:
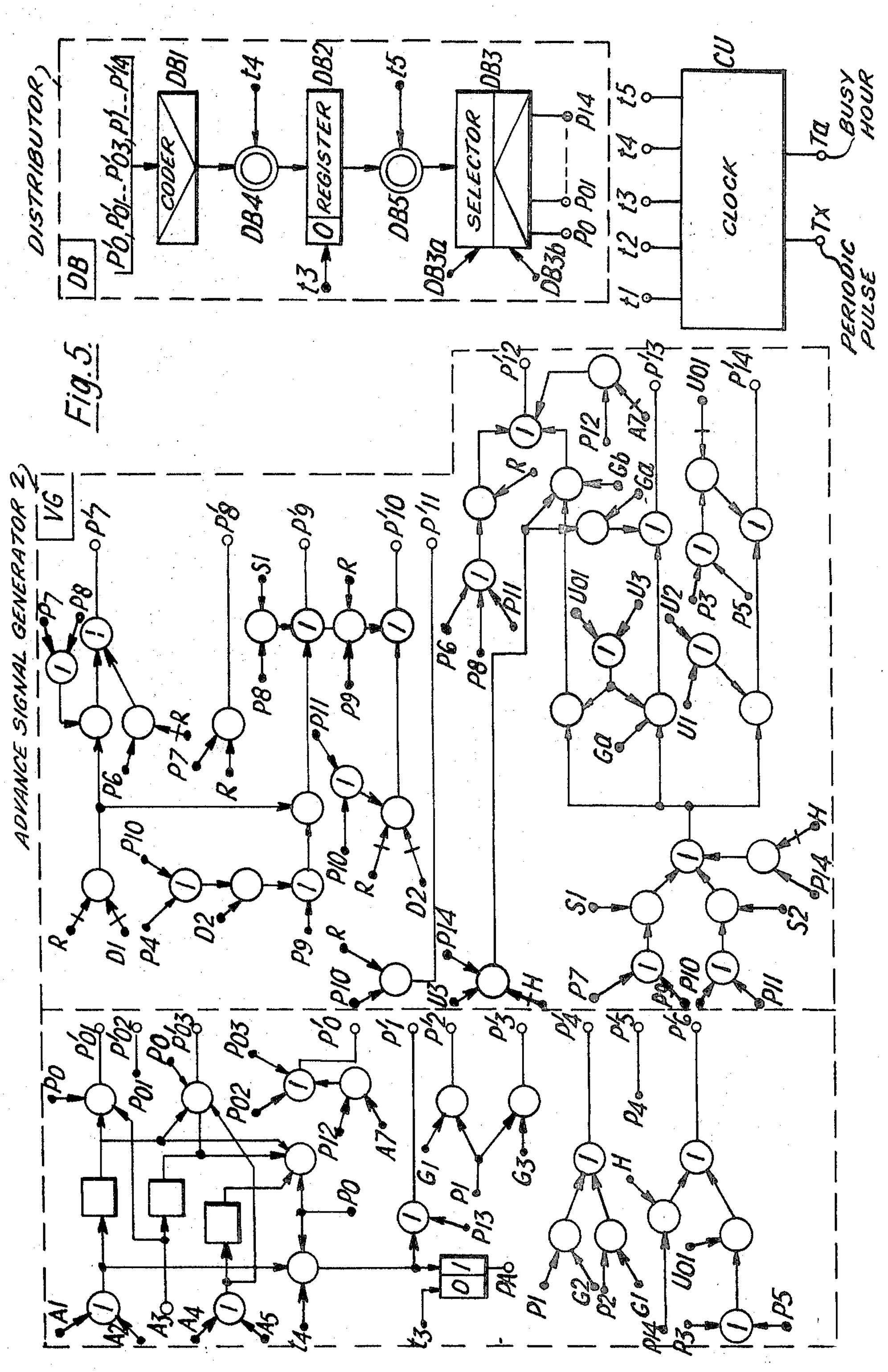
Figure 6:
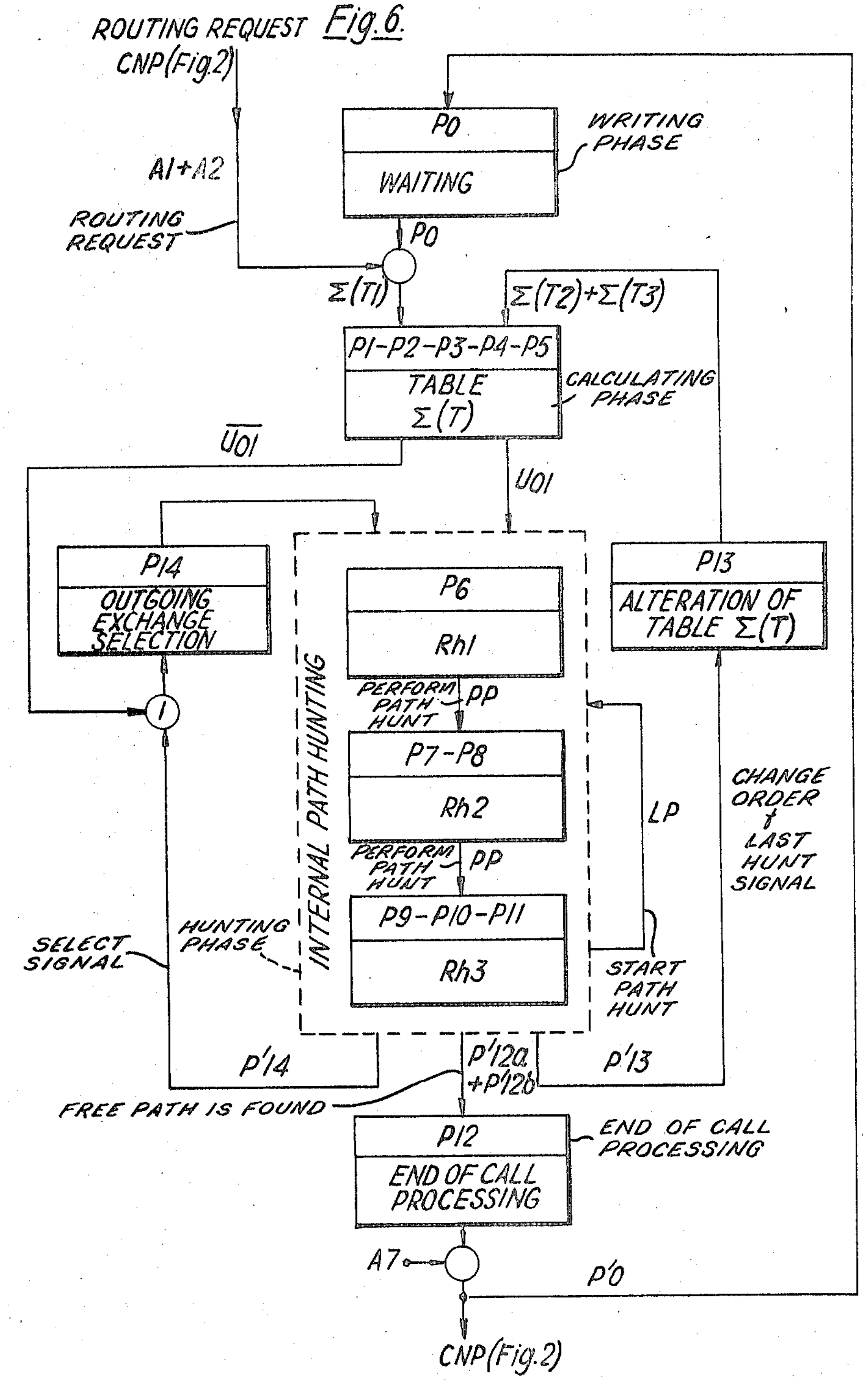
Figure 7:
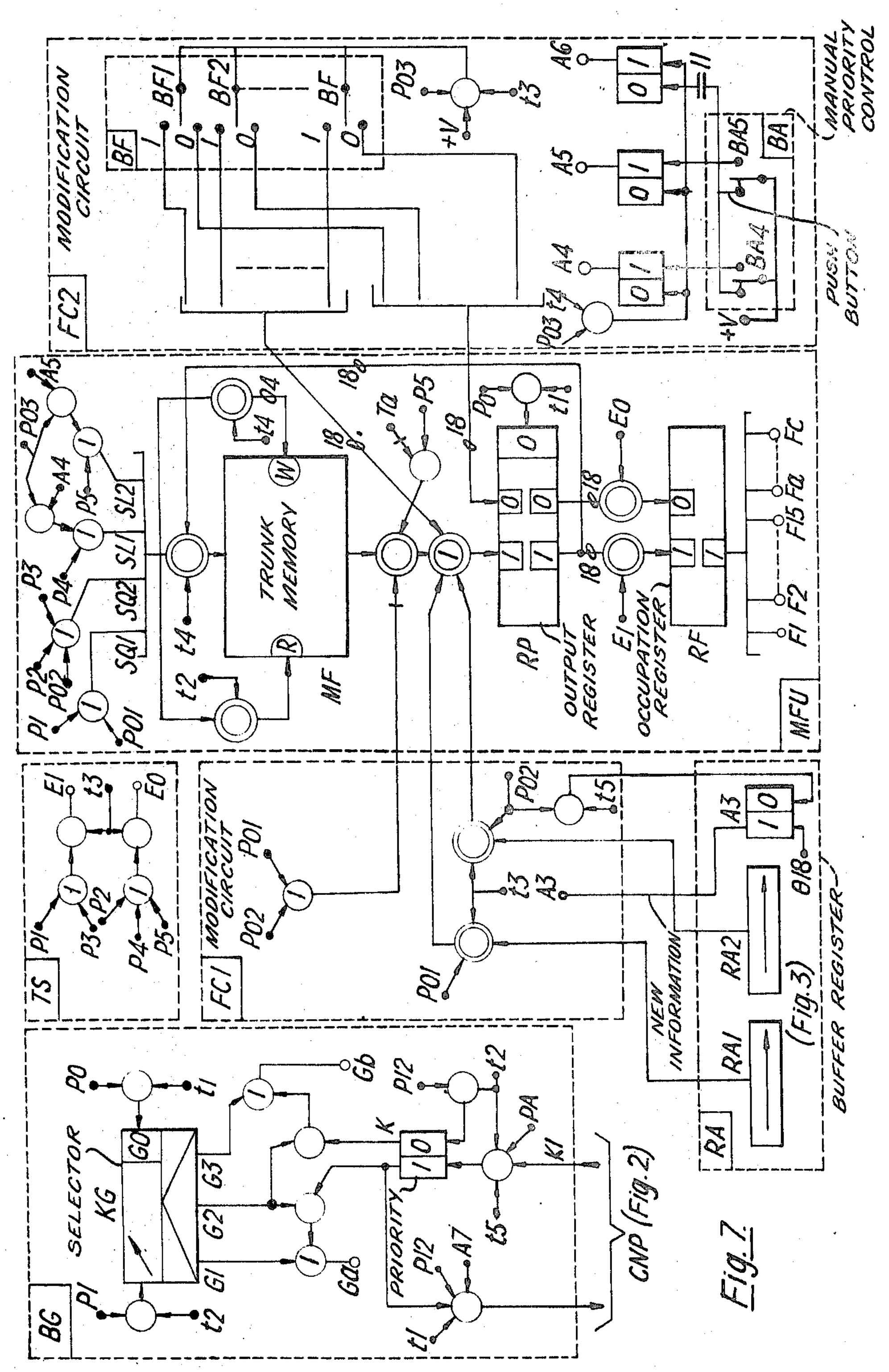
Figure 8:
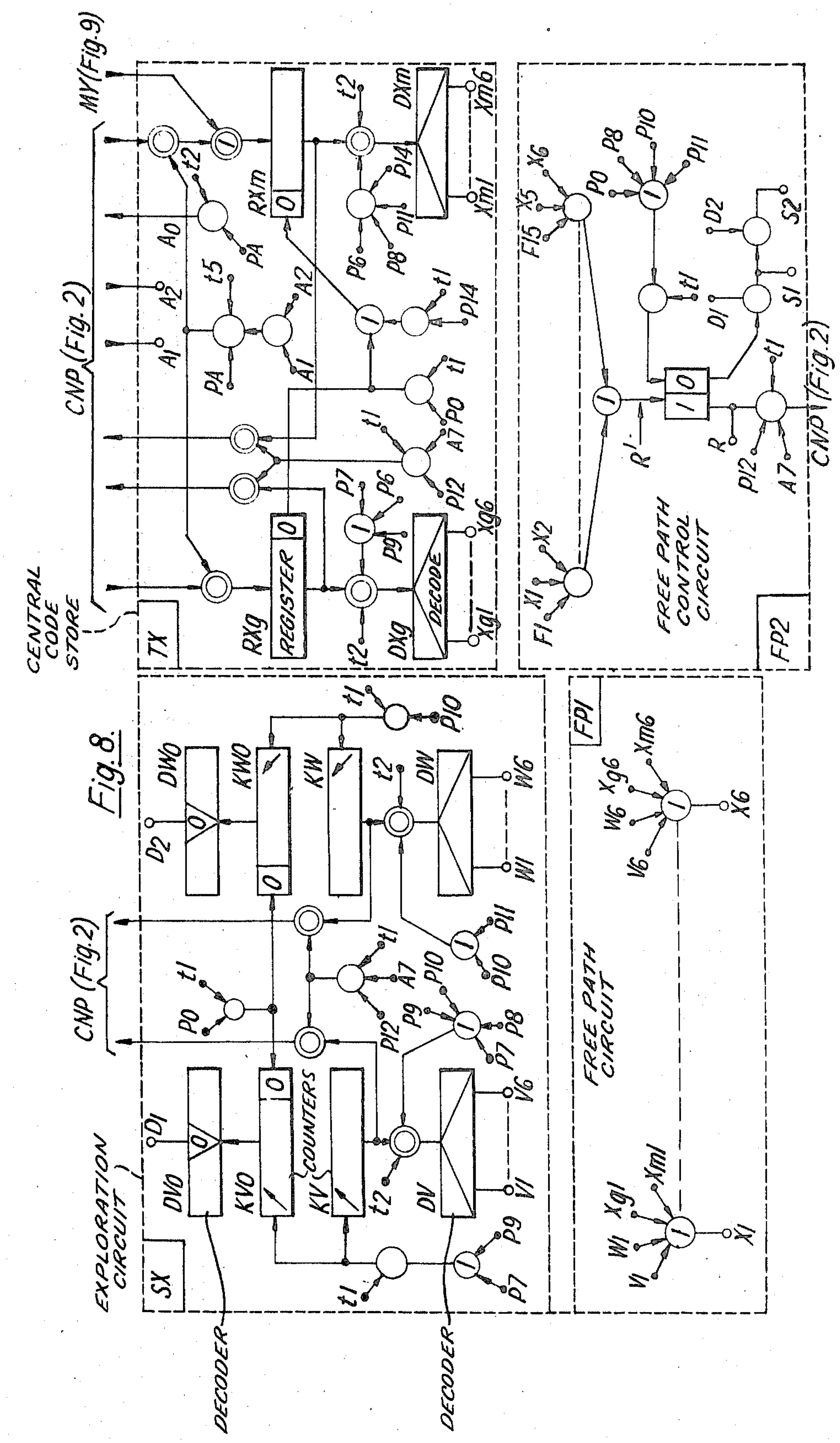

The present invention will be particularly described with reference to the accompanying drawings, in which:

- FIGS. 1*a*—*lp* represent certain symbols used in the FIGS. 3, 5, 7, 8 and 9;
- FIG. 2 represents a telephone network with a central processor;
- FIG. 3 represents the circuit for supervising the trunk occupation levels;
- FIG. 4 represents a diagram concerning a system of measurement and of coding of the occupation levels;
- FIG. 5 represents the time control circuit supplying the phase signal of the path hunting program;
- FIG. 6 represents the phase diagram of the path hunting program;
- FIG. 7 represents the circuits used for building the occupation tables;
- FIG. 8 represents the circuits used for the routing of the internal calls;
- FIG. 9 (sheet 5 of drawings) represents the circuits used for the routing of outgoing calls;

Before starting the description of the invention, the principle of notations in logical algebra used in certain cases, is explained in order to simplify the writing in the description of the logical operations. The subject is treated in the book "Logical design of digital computers" by M. Phister (J. Wiley–publisher), and elsewhere.

Thus, if a condition characterized by the presence of a signal is written A, the condition characterized by the absence of said signal will be written $\overline{A}$.

These two conditions are linked by the well known logical relation $A\times\overline{A}=0$, in which the sign "×" is the symbol of the coincidence logical function or AND function.

If a condition C appears only if the conditions A and B are simultaneously present, one writes $A\times B=C$ and this function may be carried out by means of a coincidence or AND circuit.

If a condition C appears when at least one of two conditions E and F is present, one writes $E+F=C$ and this function is carried out by means of a mixing gate or OR circuit.

Since these AND and OR logical functions are commutative, associative and distributive, one may write:

$A+B=B+A$;

$A\times(B+C)=A\times B+A\times C$;

$(A+B)(C+D)=A\times C+A\times D+B\times C+B\times D$; etc. ...

Last, a function of two variables A and B may present four possible AND combinations, the three combinations are generically represented by the expression $\overline{A\times B}$.

In the FIGS. referenced by the digit 1 followed by a bracketed letter, the meaning of some particular symbols used in the drawings which come with the description of the invention, are as follows:

- FIG. 1*a* represents a simple AND circuit;
- FIG. 1*b* represents a simple OR circuit;
- FIG. 1*c* represents a multiple AND circuit, which comprises four AND circuits, each having a first input terminal connected to each one of the conductors 91*a* and a second input terminal connected to a common conductor 91*b*;
- FIG. 1*d* represents a multiple OR circuit which comprises, four OR circuits having each two input terminals 91*c* and 91*d* and which delivers, over the four output conductors 91*e*, the same signals as those applied over either of said input terminals;
- FIG. 1*e* represents an AND circuit having two input terminals 91*f*, 91*g* and which is blocked when a signal is applied over the input 91*f*;
- FIG. 1*f* represents an inverter circuit;
- FIG. 1*g* represents a delay circuit;
- FIG. 1*h* represents a bistable circuit or flip-flop to which a control signal is applied over one of its input terminals 92–1 or 92–0 in order to set it in the 1 state or to reset it in the 0 state. A voltage of same polarity as that of the control signal is present, either on the output 93–1 when the flip-flop is in the 1 state, or on the output 93–0 when it is in the 0 state. If the flip-flop is referenced B1, the logical condition which characterizes the fact that it is in the 1 state will be written B1 and that characterizing the fact that it is in the 0 state will be written $\overline{B1}$;
- FIG. 1*i* represents a group of several conductors, five in the considered example;
- FIG. 1*j* represents a flip-flop register. In the case of the figure, it comprises four flip-flops having its 1 input terminals connected to the conductors of the group 92*a* and its 1 output terminals connected to the conductors of the group 93*a*. The digit 0, placed at one end of the register, means that this latter is cleared when a signal is applied on the conductor 91*h*;
- FIG. 1*k* represents a decoder which transforms a 4-digit binary code group applied over the group of conductors 94*a* into a 1 out of 16 codes, so that a signal appears on only one among the 16 conductors 94*b* for each one of the code groups applied at the input;
- FIG. 1*l* represents a decoder which delivers an output signal only when the binary code group corresponding to the decimal number 5 is applied over its input terminals;
- FIG. 1*m* represents a register similar to that shown on FIG. 1*j* but wherein the conductors 94–1 and 94–0 are connected respectively to the 1 and 0 output terminals of the flip-flops. One would use the same notation if the input or the output side of the bistables of a counter or of a register was similarly controlled in a symmetrical way;
- FIG. 1*n* represents a flip-flop counter which counts the pulses applied to its input terminal 94*c* and which is cleared by the application of a signal on its input 94*d*. The 1 outputs of the flip-flops are connected to the output conductors 94*e*;
- FIG. 1*o* represents a shift register receiving the input signals on terminal 95*f* and the advance signals on terminal 95*g*;

FIG. $1p$ represents a selector constituted by the association of a register and of a decoder such as they are shown in FIGS. $1j$ and $1k$.

In the course of the description, the reference of a signal preceded by the letter C identifies the binary code which, when decoded, gives the signal. Thus CW$x$ designates the code to which corresponds the signal W$x$.

At last, one will note that, in the different figures associated with the description, the electronic gates (AND, OR circuits) are not generally referenced. In fact, every gate is unambiguously identified, in the test, by the logical equation describing the function it performs and by the figure number, the reference of each applied elementary signal being set near the corresponding input terminal. Thus, the AND circuit of FIG. $1a$ would be defined as the logical circuit delivering a signal W$v$ for the logical condition: W$t$×W$u$, FIG. $1a$.

A telephone exchange of the type described in the article referenced $a$ is a centralized control system making use, for the processing of each cell, of a plurality of programs which may be classified into three groups: the input and output programs PB, the call and connection control programs PA and the service programs PS.

The input programs enable the detection of the modifications which take place in the equipments located in the exchange and comprise:

The cyclic scanning programs for detecting service requires from lines and trunks;

The dial pulse scanning program for detecting the reception of dial pulses;

The ringing scanning program for detecting the answer of called subscribers.

The output programs control equipments located in the central exchanges, such as the speech network control circuits, the junctors, etc. ...

The call and connection control control programs, which are used in the different phases of a call, operate in the centralized control circuit over data supplied by the input and output programs. Among these programs, one may quote:

The dialing connection program for connecting a calling subscriber to a digit receiver;

The digit analysis program;

The ringing and answer detection program;

The disconnect program for cutting off the speech path.

The service programs are called by the call control programs and by the maintenance and diagnosis programs. Among those which are called by the call control programs, there is the translation program which first translates the directory number into an equipment number, and which delivers the class of service and the path information according to the central exchange code, and second, the network control program. The function of this last program, as mentioned in page 2503 of the article referenced $a$ is to control the following operations:

Storage of data concerning the occupation of the different "link" between the selection stages of the central exchange, this word "link" designating the paths established by the multiselectors in the case where the stages are equipped with crossbar switches;

Free path search in the successive selection stages of the central exchanges;

Sending of instructions to the selection stages for connection setting up between the line equipments and the junctors.

The data concerning the occupation of the links is stored in one part of a call memory MCL which is divided into:

A link memory or "network map" used for path hunting and comprising one address per link, the information stored characterizing the fact that this link is free or busy;

A path memory used for the connection release and comprising an address for each junctor terminal having access to the incoming or outgoing equipment (lines or trunks). It is subdivided into:

a. a line path memory comprising one address per junctor terminal wherein is written the code of the line connected to it, b. a trunk path memory comprising one address per trunk in which is written the code of the terminal of the junctor connected to it.

The trunk supervision and path hunting circuit according to the invention is not associated with a central exchange, but with a centralized control telephone network. The different functions controlled by the above-mentioned programs are distributed between the central exchanges, and a single central control unit for the totality of the network, which will be called central processor CNP (FIG. 2). In an organization of this type, all the programs, the call memory, the translator, etc. ... are located in the circuit CNP and are shared by the whole of the network. Each central exchange comprises then only the selection stages, the scanning circuits and the switch control circuits.

FIG. 2 represents thus the central processor CNP and the central exchanges X1, X2 ... X$n$ of the network which it controls; the groups of subscribers lines S$l$1, S$l$2 ... S$ln$ being connected to said exchanges. The interconnections between central exchanges are made by the trunks F12 to F1$n$ for those connecting the central exchange X1 to the central exchanges X2 to X$n$, etc. ...

The circuit CNP comprises also the programs PB, PA, PS, the call memory MCL, the translator TRD and the central control unit MCU. This latter has access first to each of the central exchanges X1 to X$n$ through at least one service channel permanently assigned to it, and second to the ancillary circuits ANC such as those performing the message accounting.

Each central exchange such as X1 comprises then only the following circuits:

The switching network SN;

The group of trunk circuits ST;

The line and trunk scanning circuits SC;

The switching network control circuits SN.

The scanning circuit SC of the central exchange X1 receives, over its service channel, the supervision orders delivered by the input programs and transmits to the circuit CNP the data concerning the call detection, the reception of digits transmitted by a given subscriber or received over a trunk, etc. ...

The control circuit SM of the switching network receives, over the service channel, the orders concerning the connections to set up or to release in the network SN, these orders being supplied by an outgoing program.

The trunk circuit ST receives on its input ST$a$, the messages to be transmitted over the trunks, such as the digits concerning an outgoing call.

The information transmitted over the service channels belong to several different categories: permanent cyclic scanning (line, trunk or junctor scanning), selective scanning (digit detection, bell connection, etc. ...) and speech network control. Several ways of transmission may be thought of such as the transmission over several service channels having each one a particular assignment or the time multiplex transmission over one single service channel.

By way of nonlimitative example, a trunk supervision and path hunting circuit route internal and outgoing (or external) calls in an interconnected network X comprising $n$=6 central exchanges referenced X1 to X6.

If this network is completely interconnected, it comprises:

$$N'=\frac{n(n-1)}{2}$$

internal trunks which will be referenced F1 to F15 and comprise each, a certain number of channels or junctions, the number does not have to be defined. This network is connected to the adjacent networks through a certain number of outgoing trunks. Between the network X and an adjacent network Y of similar structure, $p$ internetwork trunks F$a$, F$b$ ... F$p$ connected to the outgoing exchanges X$a$, X$b$ ... X$k$ of the network X ($k \leq p$).

Each trunk is characterized by the three following parameters:

Occupation level: over each trunk of the network, the number of busy channels is measured, permanently or at regular intervals, and a certain number of occupation levels is defined according to the percentage of busy channels. In the example chosen, four different states Q*a*, Q*b*, Q*c*, Q*x* will be defined, the state Q*a* corresponding to a minimum occupation of the trunk, the states Q*b* and Q*c* to ever increasing occupations and the state Q*x* to the total occupation (blocking);

Priority assignment: certain groups of lines may be assigned, according to various criteria, tot to the transmission of priority calls. By way of a nonlimitative example, the following will be defined:

a. the permanent priority assignment characterized by the logical condition $\overline{L1}$, b. the priority assignment during the busy hour characterized by the condition $\overline{L2}$.

When the central processor asks for a routing, one calculates for each trunk a first function or "occupation class" T1=*f*1 (Q, L1, L2), which may take one of the values 1 or 0 characterizing the fact that this trunk may be used or not for this specific operation. In the described example, this function T1 is set up according to the logical equation T1=Q*a*×L1×L2. A given trunk will be thus considered as being in the class T1 if it presents an occupation state Q*a* and if it is not assigned permanently or according to the call hour, to the transmission of priority calls. If this first function does not enable the connection to be set up, a second function T2 is calculated according to the logical equation: T2=(Q*a*+Q*b*)×L1×L2. A given group of lines will thus be considered as being in the class T2 if it presents one of the occupation states Q*a* or Q*b*, and if it is not assigned either permanently or according to the call hour to the transmission of priority calls. Last, if this function T2 does not enable the connection to be set up a third function T3 is computed according to the logical condition: T3=$\overline{Qx}$. A given trunk will thus be considered as being in the class T3 in all the cases, except when it is blocked. It will be seen further on that this function T3 is calculated and used only in the case of a priority call characterized by the logical condition K1.

In the course of the description, the expression "Table of occupation" will designate one of the ensembles Σ(T1) or Σ(T2) or Σ(T3) of the occupation classes T1 or T2 or T3, calculated at a given instant for the whole of the N′+*p* trunks.

The path hunting processing will be described next for a call originating from a subscriber served by the central exchange X*g* and terminating at either a subscriber's line connected to an exchange X*m* belonging to the same network (internal call) or a subscriber's line connected to an exchange Y*m* belonging to another network (external cal). In both cases, the call is detected by the circuit CNP of the network X which transmits to its path hunting circuit the call identification codes (codes of the originating exchange X*g* and of the terminating exchange X*m*, signal K1 ou $\overline{K1}$ according to whether the call has priority or not) and a signal A1 (internal routing request) or A2 (external routing request).

When the central processor makes a request for an internal routing (condition A1) the occupation table Σ(T1) of the network is first calculated, and the direct path R*h*1=X*g*/X*m* connecting the originating exchange X*g* to the terminating exchange X*m* is searched for. If this path R*h*1=X*g*/X*m* does not exist, a path R*h*2=X*g*/X*v*/X*m* passing through an intermediate exchange X*v* is searched for. This search is carried out by exploring all the possible values for *v*, viz. *v*=1 to 6. No result is obtained when X*v*=X*g* or X*m*. If no path of this type R*h*2 exists a path R*h*3=X*g*/X*v*/X*w*/x*m* passing through two intermediate central exchanges X*v* and X*w* is searched for. This search is carried out by exploring all the possible values for *v* (such as a link X*g*/X*v*) which may be set up and by exploring, for each one of these connections, all the possible values for *w*, viz. *w*=1 to 6. This method of path hunting might be extended to paths of the types R*h*4, R*h*5, etc. ... passing three, four, etc. ... intermediate central exchanges and/or that one might impose limitations to the duration of the operation, for instance, by limiting certain explorations.

If it has not been possible to find a path, the occupation table Σ(T2) is calculated and the same operations are carried out again.

If it was not possible to find any path by means of the table Σ(T2), and that the call has no priority, it is considered that the connection cannot be set up, this information being transmitted to the central processor.

If the call has priority, the table Σ(T3) is calculated and the same operations are carried out again. If no free path is found, the operation is as in the previous case.

In the case of an external routing, a translator is associated the circuit CNP (FIG. 2) of the orient originating network deliver the identity of one or several outgoing central exchanges X*s* connected directly to the terminating network. A central exchange X*s* is thus first searched for by consulting the translator; its outgoing trunk having access to a central exchange Y*e* is checked and if it is free, a free path X*g*/ ... /X*s* is searched for. When this path is found, the circuit CNP controls the setting up of the connection X*g*/ ... /X*s*/Y*e* and sends the outgoing call data over the connection. This data includes the code of the terminating exchange Y*m* and the called subscriber's code. The detection of this call by the circuit CNP of the network Y gives to the central processor of said network the identification codes required for setting up the connection Y*e*/ ... /Y*m*. It is thus seen that, from the point of view of the path hunting, the problem is reduced to finding— the originating network—an outgoing exchange X*s* having a direct access to the terminating network and to set up the connection X*g*/ ... /X*s*. When this connection is set up the circuit CNP of the network X elaborates, in the manner described in the articles referenced *a* and *b*, outgoing call information which are sent to the circuit ST (see FIG. 2) of the exchange X*g* or of the exchange X*s* which are then transmitted over the outgoing trunk connecting X*s* and Y*e* and received by this latter exchange.

It is realized that one might use other processes for performing an external routing. Thus, for instance, the outgoing trunks can connect only adjacent networks and the path hunting, in the network successively crossed, are carried out then in an iterative manner.

In the described processing mode, the table Σ(T1) is first calculated, as in the case of an internal routing, then the translator is interrogated to find the code of *k* different outgoing exchanges ($k \leq p$) defining *k* outgoing paths, R*v*1, R*v*2 ... R*vk*, such as R*v*1 should be the shortest path X*g*/ ... /Y*m*, R*v*2 the path immediately longer, etc. ... For the sake of simplification of the description one will choose *p*=*k*=3

Several possible operating processes exist for carrying out this external routing operation. Thus:

Process 1: the translator is consulted for obtaining the code of the exchange X*s* giving a path of the type R*v*1. It is checked, by means of the table Σ(T1) by means of the tables Σ(T2), and Σ(T3), to find whether the outgoing trunk is free. If it is a connection X*g*/X*s*, of the type R*h*1, R*h*2 or R*h*3, is set up by using the table Σ(T1) and, by using the tables Σ(T2), Σ(T3). If the outgoing trunk is not free, the same operations are carried out once again, starting from the outgoing exchange which gives a path of the type R*v*2 then of the type R*v*3.

Process 2: the occupation table Σ(T1) is set up, and the translator is consulted for obtaining the outgoing exchange code which gives a path of the type R*v*1. If the outgoing trunk is free—always by using the same table Σ(T1)— connection X*g*/X*s* of the type R*h*1, R*h*2 or R*h*3 is set up. If this group of lines is not free, or if a path of the type R*h*3 is not available, the translator is consulted for a path of the type R*v*2, which eventually starts, a search for a path of the type R*h*1, R*h*2, R*h*3. If this search does not give results, the same operations are carried out starting from a path of the type R*v*3. If the use of the table Σ(T1) has not enabled a free path to be found, the same process is carried out again with the table Σ(T2) and eventually, with the table Σ(T3).

An external routing circuit, which operates according to this last process, is described next.

The routing control in a network controlled by means of a single central processor requires the performance of two different types of operations. First it must measure and the coding of the states of occupation of all the trunks connected to the central exchanges X1 to X6. Second, it must search for a free path between the originating exchange X*g* and the terminating exchange X*m* or the outgoing exchange X*s*.

Since the performance of these operations is in a centralized system, as described in the article referenced *a*, they require the addition in the central processor of two additional programs, viz.:

the program of supervision of the occupation level which, in the example considered, is a wired program;

the path hunting program PAB.

In order to facilitate the continuation of the description, this latter will be divided in the following way:

1. Occupation level supervision,
2. Routing of the calls:
   - 2.1–path hunting program,
   - 2.2–setting up of the occupation tables,
   - 2.3–processing of the internal calls,
   - 2.4–processing of the outgoing calls,
   - 2.5–data transfer between the central processor and the routing circuits.

1. OCCUPATION LEVEL SUPERVISION

In FIG. 2, of the different programs used in the centralized control network, the trunk path memory located in the call memory MCL comprise one address per trunk, which is empty when this trunk is free, and in which the code of the junctor to which it is connected is written when it is busy. This memory contains data permanently characterizing the occupation level of the trunks connected to the exchange. If these addresses are grouped in such a way as to select one of them by means of the code of a trunk code and of a junction (or channel) code, it is realized that each signal of selection of a trunk indicates a modification by one unit in the number of free junctions in the trunk. In the case where one junctor code must be written in the selected address (setting up of a new connection), this code is previously written in an input register, to discriminate between a setting up or a release. This register contains or does not contain a code at the time of selection of one address respectively, a signal B1 or $\overline{B1}$. If SF designates a signal characterizing the selection of one trunk, the condition SF×B1 means that one more junction is busy, and the condition SF×$\overline{B1}$ means that one junction is released.

These signals SF, B1, as well as the code CF*m* of the trunk F*m* will be used for the measurement and the digital coding of the trunk occupation levels.

FIG. 3 represents in a schematic way all of the circuits used in the occupation level supervision, all these circuits being located in the circuit CNP (FIG. 2). One has thus:

1. The junction path memory MT with its output register RL and its selection circuits. These latter comprise the trunk code register RCF and the junction code register RCJ as well as the logical selection circuit SLC enabling the selection of one junction address. The decoder DL associated with the register RL delivers the signals B1 and $\overline{B1}$ and the decoder DF associated with the register RCF delivers the signal SF.
2. A signal distributor GS which is activated by a signal from the flip-flop S*d*. When no setting up or release of a junction is in course (condition $\overline{SF}$) and when the flip-flop A3 (circuit RA at the bottom of the FIG.) is in the 0 state, this flip-flop S*d* is set to the 1 state if a signal T*x* which appears at regular intervals (every minute, for instance) is present —this signal being supplied by a clock CU, FIG. 5. The signal S*d* controls the starting of the signal distributor GS which comprises a signal generator delivering advance signals $\theta_0$ to a selector with N′+*p*=18 positions (these circuits have not been represented on the FIG.). This distributor delivers first a series of N′+*p*=18 codes referenced C$\theta$, a signal $\theta_{18}$ obtained by the decoding of the last of these codes and the signals $\theta_0$. The signal $\theta_{18}$ controls the setting to the condition $\overline{Sd}$, so that the signal S*d* is present during the time of elaboration of the codes C$\theta$.
3. A memory MQ called "trunk supervision memory," which is part of the memory MCL (FIG. 2) and which comprises N′+*p* addresses. Each one of these latter is assigned to one of the trunks of the network, and it is divided into two parts reserved to the writing, respectively, of the number M of busy junctions in the trunk, and of the corresponding occupation level codes (code CQ*a*, CQ*b*, CQ*c* or CQ*x*). The address selection is carried out under the control of the selector KM. When one address is selected, its contents is transferred into the registers RM and RQ. The number M is applied to the circuit SA which carries out the logical operation M±1 according to whether a signal B1 or $\overline{B1}$ is applied to it and the new number is compared in the circuit SB, to numbers M1, M2, etc. ... characterizing the boundaries of the occupation levels. This comparison enables the corresponding code CQ to be generated which comprises two digits Q1 and Q2. When the condition $\overline{Sd}$ is present, this code, as well as the number M±1 delivered by the circuit SA are written in the same address of the memory MQ. When the condition $\overline{Sd}$ is present, the numbers M and CQ stored in the registers RM and RQ are directly rewritten in the memory MQ.
4. A buffer circuit RA comprising the flip-flop A3 and the shift registers RA1, RA2; each having a capacity of N′+*p* digits. When these registers are clear, the flip-flop A3 is in the 9 state.

The signals $\overline{Sd}$ and S*d* define the two cycles of the trunk occupation supervision.

First cycle: the signal $\overline{Sd}$ controls the sending of codes to the selection circuits of the memory MT each time a modification occurs over one trunk and the signal SF appearing during such a modification assures the holding of the flip-flop S*d* in the 0 state. The trunk code stored in RCF is transferred to the selector KM which controls the reading of the corresponding line of the memory MQ. The number M is modified in the circuit SA and the new number, as well as the code CQ, are rewritten at the same address.

Second cycle: when the signal S*d* is present, the codes C$\theta$ assure the cyclic selection of the N′+*p* lines of the memory MQ and the signals $\theta_0$ control the transfer, in the registers RA1 and RA2, of the digits Q1 and Q2 of the occupation level codes. Besides, the codes read in the parts M and CQ of this memory are rewritten without modification at the same address. When the memory has been completely read, the signal $\theta_{18}$ controls the setting to the 1 state of the flip-flop A3 and to the 0 state of the flip-flop S*d*, so that one comes back to the first cycle.

The operations performed in the circuits SA and SB may be carried out in certain circuits existing in the circuit CNP. In particular, the performance of the operation M±1 and the coding of the occupation level may require instructions of the type of those mentioned page 1864, paragraph 3.13 of the article referenced *a*.

In the simplest coding mode, it will be admitted that the level M1 constitutes the boundary between the occupation states Q*a* and Q*b*, that the level M2 constitutes the boundary between the states Q*b* and Q*c* and that the level Q3 corresponds to the class Q*x*. The coding procedure is then the following:

a. if M<M1, the trunk is in the state Q*a*;
b. if M≥M1, M is compared to M2;
   if M≤M2, the trunk is in the state Q*b*;
   if M>M2, the trunk is in the state Q*c*;
c. if M=M3, the trunk is set afterwards to the state Q*x*.

Another mode of coding has overlapping ranges between two adjacent stages, as indicated in the diagram of FIG. 4, these ranges being represented in thick lines. The coding procedure is then the following:

a. if M is outside one of the overlapping ranges, the trunk is put in the corresponding occupation state;

b. if M is in an overlapping range, the previous value of the code CQ is not modified.

This last mode of coding presents the advantage that the frequency of the changements of occupation states is considerably reduced.

2. ROUTING OF THE CALLS

2.1 Path hunting

The path hunting program PAB comprises 18 phases defined by signals referenced P*o*1, P*o*2, P*o*3, used for data modification, and Po to P14 used for call processing. In order to simplify the description of the operations, it has been assumed, by way of a nonlimitative example, that this program was elaborated in a time control circuit represented on FIG. 5. This circuit comprises the advance signal generator VG and the distributor DB, and it is organized in such a way as each phase signal has a fixed duration or cycle, a given signal being eventually elaborated several cycles successively.

Each cycle is divided into five basic time slots, $t1$ to $t5$, of equal duration, the corresponding signals being delivered by a clock CU which delivers also:

a. a signal T*a* during the whole duration of the busy hour, b. a signal T*x* which appears at regular intervals (every minute, for instance) and which is used in the trunk supervision circuit (FIG. 3).

The distributor DB comprises the coder DB1, the register DB2 cleared in $t3$, the selector DB3 constituted by a register DB3*a* and by a decoder DB3*b*, and the multiple AND circuits DB4, DB5. It is controlled by advance signals P'*o*1, P'*o*2, P'03 and P'*o* to P'14, and it is designed for delivering a signal on the output bearing the same number reference. Thus, if a signal P'7 is applied to it, the coder DB1 transforms this signal into a four digit code which is transferred over four conductors to the register DB2 in which it is written in $t4$. In $t5$, this code is transferred, over eight conductors, to the register DB3 and a signal appears on the output terminal P7. It is seen that this signal is present during at least the times $t1$–$t2$–$t3$–t4 of the phase P7.

The circuit VG delivers the advance signals by means of the electronic gates shown on the FIG. the corresponding logical conditions being grouped in the table I.

It will be noted (lines 12*a* and 12*b*) that there appears two advance signals referenced P'12*a* and P'12*b*, which both control the setting into phase P12. This partition has been made for simplifying the description of the operation of the path hunting circuit, the signal P'12*a* characterizing the fact that a free path has been found and the signal P'12*b* characterizing the fact that a call is lost.

The circuit VG comprises, besides the logical circuits which set up the logical conditions represented on table I, a flip-flop PA set to the 1 state for the logical condition $Po\times(A1+A2)\times t4$ and to the 0 state by a signal $t3$.

The duration of the phase signals and the operations they control are summarized hereafter:

P*o* :(duration : undetermined)—Waiting phase—Clearing of the circuits.

P1: (duration : one cycle)—First operation for the calculation of the occupation tables Σ(T1), Σ(T2), Σ(T3).

P2 : (duration : one cycle)—Second operation for the calculation of the occupation table Σ(T1).

P3 : (duration : one cycle)—Second and last operation for the calculation of the occupation table Σ(T3).

P4 : (duration : one cycle)—Third operation for the calculation of the occupation table Σ(T1) and second operation for the calculation of Σ(T2).

P5 : (duration : one cycle)—Last operation for the calculation of the tables Σ(T1) and Σ(T2).

P6 : (duration : one cycle)—Checking of the existence of a path R*h*1=X*g*/X*m*.

P7 or P9 : (duration : one to six cycles)—Exploration of the central exchanges for finding a connection X*g*/X*v* in a path search of type R*h*2 or R*h*3.

P8 : (duration : one cycle)—Checking of the existence of a free path X*v*/X*m* in a path hunt of type R*h*2.

P10 : (duration : one to six cycles)—Exploration of the central exchanges in order to find a link X*v*/X*w* in a path hunt of type R*h*3.

P11 : (duration : one cycle)—Checking of the existence of a free path X*w*/X*m* in a path hunt of type R*h*2.

P12 : (duration : undetermined)—Final phase : Waiting for transfer of the identification information to the circuit CCC a. condition P12*a* : a free path has been found and a call may be set up;

b. condition P12*b* : no free path has been found and the call is lost.

P13 : (duration : one cycle)—No free path R*h*1 or R*h*2 has been found, with one of the tables Σ(T1) or Σ(T2). It is an intermediate phase which controls the calculation, starting from the next cycle, of the table Σ(T2) or Σ(T3).

P14 : (duration : undetermined)—Selection of an outgoing central exchange X*s* for the performance of an external routing.

P*o*1 or P*o*2 : (duration : one cycle each)—Modification of the occupation state information Q1 and Q2.

P*o*3 : (duration : one cycle)—Selective modification of the information L.

P*o*4: (duration : one cycle)—Selective modification of the information H.

It will be observed that the phases P*o*, P7, P9, P10, P12, P14 have a duration that may be higher than one cycle, this taking place when one of the looping conditions mentioned in the column A of the table I is fulfilled. In the opposite case, a phase change condition (column B, table I) is fulfilled, and a new phase signal appears at the next cycle.

By way of example, the elaboration of the advance signals follows a phase signal P7 which controls, during a path hunting of type R*h*2, the exploration of the trunks connected at central exchange of the type *v* up to the finding of a free path X*g*/X*v*.

This exploration may last from one to six cycles, and at the end of each cycle one obtains:

a signal R meaning that a free path X*g*/X*v* has been found, or a signal $\overline{R}$ (flip-flop R, circuit FP2, FIG. 8), a signal D1 meaning that the whole of the *v* central exchanges has been explored, or a signal $\overline{D1}$ (decoder DV*o*, circuit S*x*, FIG. 8), a signal G*a* meaning that an occupation table of higher index may still be set up, or a signal G*b* meaning that all the occupation tables which may be used have been tested (circuit BG, FIG. 7).

TABLE I

| Advance Signal | Looping condition | Phase change conditions | Line |
|---|---|---|---|
| P'0 | $P0\times\overline{(A1+A2+A3+A4+A5)}$ | $P02+P03+P12\times A7$ | 0 |
| P'1 | | $P0(A1+A2)\times t4+P13$ | 1 |
| P'2 | | $P1\times G1$ | 2 |
| P'3 | | $P1\times G3$ | 3 |
| P'4 | | $P1\times G2+P2\times G1$ | 4 |
| P'5 | | $P4$ | 5 |
| P'6 | | $(P3+P5)\times U01+P14\times H$ | 6 |
| P'7 | $P7\times\overline{R}\times\overline{D1}$ | $P6\times\overline{R}+P8\times\overline{R}\times\overline{D1}$ | 7 |
| P'8 | | $P7\times R$ | 8 |

TABLE I—Continued

| Advance Signal | Looping condition | Phase change conditions | Line |
|---|---|---|---|
| P'9 | $P9\times\overline{R}\times\overline{D1}$ | $P8\times S1+P10\times\overline{R}\times\overline{D1}\times D2+P11\times\overline{R}\times\overline{D1}\times D2$ | 9 |
| P'10 | $P10\times\overline{R}\times\overline{D2}$ | $P9\times R+P11\times\overline{R}\times\overline{D2}$ | 10 |
| P'11 | | $P10\times R$ | 11 |
| P'12a | $P12\times\overline{A7}$ | $(P6+P8+P11)\times R$ | 12a |
| P'12b | $P12\times\overline{A7}$ | $[(P7+P9)\times S1+(P10+P11)\times S2]\times Gb\times(U01+U3)+P14\times\overline{H}\times U3\times Gb$ | 12b |
| P'13 | | $[(P7+P9)\times S1+(P10+P11)\times S2]\times Ga\times(U01+U3)+P14\times\overline{H}\times U3\times Ga$ | 13 |
| P'14 | $P14\times\overline{H}\times(U1+U2)$ | $[(P7+P9)\times S1+(P10+P11)\times S2]\times(U1+U2)+(P3+P5)\times\overline{U01}$ | 14 |
| P'01 | | $P0\times\overline{(A1+A2)}\times A3$ | 15 |
| P'02 | | $P01$ | 16 |
| P'03 | | $P0\times\overline{(A1+A2)}\times\overline{A3}\times(A4+A5)$ | 17 |

Column A: $Ga=G1+G2\times\overline{K}$ $Gb=G2\times K+G3$

Column B: $S1=\overline{R}\times D1$ $S2=\overline{R}\times D1\times D2$

Table II hereafter gives the list of the different advance signals which may be elaborated at the end of one cycle of the signal P7.

TABLE II

| | Localization in the Table I | Logical conditions | Advance signal |
|---|---|---|---|
| Line: | | | |
| 1 | Line 8, column B | $P7\times R$ | P'8. |
| 2 | Line 7, column A | $P7\times\overline{R}\times\overline{D1}$ | P'7. |
| 3 | Line 13, column B | $P7\times S1\times Ga$ | P'13. |
| 4 | Line 12b, column B | $P7\times S1\times\overline{Gb}$ ($S1=\overline{R}\times D1$) | P'12b. |

It is seen that the phase signal P7 is elaborated once again at the next cycle when the condition $\overline{R}\times\overline{D1}$ is fulfilled (line 2 of the table). The equations of the line 1 and of the lines 3, 4 cover the three other cases which may be grouped under the logical condition $\overline{R}\times\overline{D1}$.

The looping is made necessary due to the fact that in the distributor DB, the code which characterizes a phase signal can be written in the register DB3*a* only during the times *t*1 to *t*4 of one cycle.

FIG. 6 represents a simplified phase diagram comprising six groups of phases:

a. Waiting phase P*o*,
b. Group of phases for calculating the tables Σ(T) and comprising the phases P1 to P5,
c. Group of the internal path hunting phases (type R*h*) comprising the phases P6 to P11,
d. Phase P12 of end of the call processing,
e. Phase P13 of changement of table Σ(T),
f. Phase P14 of outgoing central exchange selection for a path hunting of type R*v*.

The operations performed under the control of the phase signals (except P*o*) lead to one of the following results:

1. Signal P'12*a* : a free path is found (one shifts to phase P12);
2. Signal PP : perform a path hunt of the type R*h* affected by a higher index;
3. Signal LP : start of a path hunt (looping of the phase);
4. Signal P'14 : select a new outgoing central exchange;
5. Signal P'13 : change of table Σ(T);
6. Signal P'12*b* : the call is lost (one shifts to the phase P12).

The phase diagram of FIG. 6 explicits the sequence of the operations between the different groups of phases. Thus, when the circuit CNP sends one of the signals A1 of internal routing request, or A2 of external routing request, one shifts from the phase P*o* to the phase P1 [condition P*o*×(A1+A2) FIG. 5] for the calculation of the table Σ(T1). At the same time, the selector KU (FIG. 9), which was initially in the position U*o*1, is set to the position U*o*2 for a signal A2, so that the conditions U*o*1, and $\overline{Uo1}$ characterize, respectively, an internal and an external routing.

In the case of an internal routing, the table Σ(T1) is used under the control of one, several, or all the signals P6 to P11, for a path hunt of type R*h*. Since the paths of type R*h*2 and R*h*3 are searched for by exploring all the possible intermediate central exchanges, a certain number of loopings LP may take place.

If the path hunt using the table Σ(T1) gives a positive result, one has a signal P'12*a* which controls the shifting to P12. If it fails, one has a signal P'13 which controls the calculation of the table Σ(T2).

The same operations are carried out with this table, then with the table Σ(T3) constituted under the control of a signal P13 which appears if the path hunt concerns a priority call. In the path hunts carried out with these last two tables, one may have—besides the signals P'12*a* and P'13—the signal P'12*b* which indicates that no path at all has been found and that the call is lost.

In the case of an external routing (signal $\overline{Uo1}$), a signal P14 (condition P5×$\overline{Uo1}$) is elaborated soon after the calculation of the table Σ(T1). This signal controls the selection of a first outgoing central exchange X*s* for the setting up of the connection through a path of type R*v*1, then a search of path of the type R*h* is carried out, for a connection between the calling exchange X*g* and the outgoing exchange X*s*. Either a signal P12*a*, or a signal P14 which controls the selection of a second outgoing central exchange for a path hunt of type R*v*2, comprising a new internal path hunt of type R*h*. If a result P14 is obtained once again, the process starts over with a path hunt of type R*v*3. At the end of the third path hunt of type R*h* with a table Σ(T1) one has either a signal P'12*a* or a signal P13. In this last case, the table Σ(T2) is calculated and the same operations are started over again. If the call has no priority and if no path has been found one has a signal P'12*b* then P12, and the call is lost. If the call has priority, and that no path has been found, one has a signal P13, for the setting up of the table Σ(T3). If this last hunt fails one has a signal P'12*b*, then P12, and the call is lost.

When one shifts to the phase P12, either because the search has given a positive result, or because the call is lost, all the data concerning the call are transmitted to the circuit CNP as soon as this latter sends a signal A7 meaning that it is free. The condition P'o=P12×A7(table I, line zero, column B) controls then the shifting of the circuit to the waiting phase P*o*.

2.2 SETTING UP OF THE OCCUPATION TABLES

The setting up of an occupation table Σ(T1), Σ(T2) or Σ(T3) is carried out in the following circuits represented on FIG. 7:

the trunk memory MF with its output register RP comprising N'+*p* flip-flops: viz. 18 flip-flops in the example chosen;

the occupation register RF comprising 18 flip-flops assigned to the groups of lines F1 to F15, F*a*, F*b*, F*c* and the contents of which constitute, at the beginning of the phase P6, one of the occupation tables Σ(T).

All these circuits are grouped in the unit referenced MFU.

FIG. 7 represents also:

the modification circuit FC1 enabling to modify, during the phases Po1 and Po2, the occupation level information for the N'+p groups of lines. These information come from the central processor where they were written in the buffer register RA (FIGS. 3 and 7);

the modification circuit FC2 for modifying selectively an information L1 or L2 in the memory MF under the control of a phase signal Po3;

the occupation table supervision circuit BG comprising:

a. the selector KG comprising four positions Go, G1, G2, G3, and which delivers a signal G1, G2, G3 according to whether the occupation table written in the register RF, during the phases P6 to P11, is the table Σ(T1), Σ(T2) or Σ(T3). This selector is set to the position Go by the logical condition Po×t1, and it receives an advance signal for the logical condition P1×t1;

b. logical circuits delivering the signals Ga=*G1+G2×K, and Gb=*G2×K+G3 used, at time t4, in the time control circuit (FIG. 5);

The signal Ga means that, at least, one more occupation table may still be set up, the table Σ(T2) for G1 or the table Σ(T3) for G2. The signal Gb means that all the tables that may be used have been calculated. These signals are used during a path hunt of type R*h;* c. the priority flip-flop K set to the 1 state when the path hunt request concerns a priority call characterized by a signal K1 [condition: Pc×K1×(A1+A2)×2], and to the 0 state for the condition: P×t2;

the circuit TS delivering the signals E1 and Eo used for calculating the occupation tables. These signals appear for the following logical conditions:

E1=(P1+P3)×t3

Eo=(P2+P4+P5)×t3.

The memory MF in which is written permanently the data concerning each trunk, comprises four lines Q1, Q2, L1, L2, and N'+p columns F1 to F15 (associated to the N' internal trunks) and Fa, Fb, Fc (associated to the p outgoing trunks). It is a word-organized memory, one line of which is read at the time t2 and rewritten at the time t4 under the control of one of the following selection signals:

SQ1=P1+Po1 (selection of the line Q1)

SQ2=P2+P3+Po2 (selection of the line Q2)

SL1=P4+Po3×A4 (selection of the line L1)

SL2=P5+Po3×A5 (selection of the line L2).

In this memory, the lines Q1 and Q2 are reserved to the codes of the occupation levels Qa, Qb, Qc, Qx constituted by 2-digit numbers as indicated in table III.

TABLE III

| | Digit | |
|---|---|---|
| State | Q1 | Q2 |
| Qa | 1 | 1 |
| Qb | 1 | 0 |
| Qc | 0 | 1 |
| Qx | 0 | 0 |

The lines L1 and L2 are reserved to the writing, respectively, of the information of permanent priority assignment and to the information of priority during the busy hour, this latter being characterized by the presence of the signal Ta delivered by the clock CU (FIG. 5).

The operations which concern the memory MF. are the following:

modification of the trunk occupation level information under the control of the phase signals Po1 and Po2, and selective modification of an information of priority assignment under the control of a phase signal Po3;

setting up of an occupation table, this operation being started by a signal P1.

2.2.1 MODIFICATIONS IN THE TRUNK MEMORY

The processes of modification of the informations in the memory MF will be first described. These latter can take place only in the absence of routing operations which is characterized by the logical condition: $Po\times(\overline{A1+A2})$.

As it has been seen during the study of the occupation level supervision, the circuit RA (FIGS. 3 and 7) delivers a signal A3 when new information Q1 and Q2 are written in the registers RA1 and RA2. If the logical condition $Po\times(\overline{A1+A2})\times A3$ (*table I, line 15*) *is fulfilled, one shifts to the phase* Po1. The signal Po1, applied to electronic gates located in the circuits MFU and FCL, controls the following operations:

selection of the line Q1 of the memory MF under the control of the signal SQ1, blocking of the transfer, in the register RP, of the information read at the time t2 in this line, parallel transfer, at time t3, of the contents of the register RA1 (circuit RA, FIGS. 3 and 7) into the register RP. It will be reminded that these are new informations Q1 delivered by the circuits of FIG. 3, writing, at time t4, of these new information in the line of the memory selected by the signal SQ1.

At the next cycle, one shifts to the phase Po2(P'o2=Po1, table I, line 16) and the corresponding signal controls the selection of the line Q2 of the memory MF (selection signal SQ2), its reading in t2, the blocking of the transfer, of said information, in the register RP, the transfer in this register—in t3—of the contents of the register RA2 and the writing, in t4, of these new information in the line Q2. Moreover, the logical condition Po2×t5 controls the resetting to the 0 state of the flip-flop A3 (circuit RA), the condition $\overline{A3}$ meaning that the modification is completed.

The modification of the information of priority assignment L1 or L2 related to a given trunk is controlled manually by the simultaneous operation of one of the pushbuttons of the group BA, and of one of the three position keys of the group BF which are located in the circuit FC2 (FIG. 7).

The pushbuttons BA4 and BA5 of the group BA enable the selection of the type of modification to be carried out. Thus, when the pushbutton BA4 is closed, a voltage + V is applied to the flip-flop A4 which sets to the 1 state characterizing the fact that an information L1 must be modified. In the same way, the operation of the pushbutton BA5 controls the setting of the flip-flop A5 to the 1 state characterizing the fact that an information L2 must be modified. When the pushbutton which has been operated is released, a positive pulse is transmitted through the capacitor 11, to the flip-flop A6 which is reset to the 0 state.

The apparition of one of the signals A4 or A5 controls the shifting to the phase Po3 if one is in the phase Po, if no routing is being performed and if a modification of the information Q1 and Q2 is not taking place [condition : $Po\times(\overline{A1+A2})\times\overline{A3}\times(A4+A5)$, table I, line 17]. At the time t3 of this phase, the three-position keys of the group BF are supplied by a voltage +V, each one of these keys BF1 to BF15, BFa, BFb, BFc being assigned to a trunk and having access to the inputs 0 and 1 of the corresponding flip-flops of the register RP.

When the operator wants, for instance, to put the trunk F6 in the condition $\overline{L1}$ in order to reserve it to the transmission of priority calls, he presses the pushbutton BA4 (apparition of a signal A4) and he puts the key BF6 in the neutral position.

As soon as the routing circuit is free, the phase signal Po3 appears, and controls, in t3, the resetting to the 0 state of the corresponding flip-flop of the register RP. At time t4, the content of this register is transferred in the selected address, the flip-flops A4, A5 are reset to the 0 state and flip-flop A6 is set to the 1 state. The signal A6 thus obtained means that the modification is carried out, and this condition may be displayed by the lighting of a lamp which indicates to the operator that the pushbutton and the key may be released. As it has been seen previously, the flip-flop A6 resets then to the 0 state and the light switches off.

From Table I, a priority order has been set up for the processing of the operations defined by signals A1, A2, A3, A4 and A5. Thus, if the circuit CNP asks for a routing operation by sending an order A1 or A2, this latter is carried out in priority since one has $Po\times(A1+A2)=P'1$, logical condition which does not take into account the existence of a signal A3, A4 or A5. In the same way, the signals A3 and (A4+A5) are processed in lower priority orders.

2.2.2 CALCULATION OF THE OCCUPATION TABLES

The phase diagram of FIG. 6, shows that the phases P1 to P5 are reserved to the calculation of the occupation tables. The conditions are $\overline{Po1}+\overline{Po2}$ (set up by the circuit FC1, FIG. 7) as well as one of the signals E*o* or E1 (delivered by the circuit TS, FIG. 7). By referring to the detailed diagram of the unit MFU (FIG. 7), it is seen that the signal $\overline{Po1}+\overline{Po2}$ activates the multiple AND circuit controlling the transfer of the information extracted in *t*2 from the memory MF into the output register RP, the multiple OR circuit located at the output of this register receiving no other signal since one considers the operations which are performed during the phases P1 to P5. The transfer of signals appearing on the outputs 0 and 1 of the $N'+p=18$ flip-flops of the register RP towards the corresponding inputs of the register RF is carried out under the control of one of the signals E*o* or E1 appearing in *t* 3. The conditions for setting up these signals will be reminded:

$$Eo=(P2+P4+P5)\times t3$$

$$E1=(P1+P3)\times t3.$$

In *t*4, the content of the register RP is transferred in the selected address of the memory MF.

The information appearing on the outputs 1 of the $N'=p=18$ flip-flops of the register RF have been referenced F1, F2—F15, F*a*, F*b*, F*c*. The occurrence of a signal F2, for instance, means that the trunk F2 may be used for setting up a connection.

It will be noted that the transfer process, between the registers RP and RF, of the information which appear either on the outputs 1 or on the outputs 0 of the first one of these registers (selection by the signals E*o* and E1) enables to carry out, during this operation, a succession of logical operations over the variables Q1, Q2, L1, L2.

At the next cycle, the shift is to the phase P2 (condition P1×G1) which controls the reading of the line Q2 and a signal E*o* appears. The flip-flop F*x* remains in the 1 state only if the group of lines F*x* is in the state of occupation Q*a* (the code of which is 11—Table III). At the next cycle, the shift is to the condition P4 (condition P2×G1) which controls the reading of the line L1 and the setting up of a signal E*o*. Therefore, the flip-flop F*x* remains in the 1 state only for the condition L1. Last, at the next cycle, the shift is to the phase P5 (condition P4×*t*5) which controls the reading of the line L2 and the setting up of a signal E*o*. If this operation takes place during the busy hour (signal T*a*) the information L2 or $\overline{L2}$ extracted from the memory is normally transferred into the register RP. On the contrary, outside the busy hour, the transfer gate is activated for the logical condition $\overline{Ta}\times P5$. As a result, whatever may be the value of the information read, a digit 1 is written in each flip-flop of the register RP since the condition of priority assignment $\overline{L2}$ (characterized by a digit 0) must not interfere.

It is thus seen that, at the end of the phase P5, the flip-flop F*x* is in the 1 state only if the function $T1=Qa\times\times L2$ is satisfied and if the table Σ(T1) defined previously has been set up in the register RF.

At the next cycle, the shift is either to the phase P6 if an internal routing has to be carried out (condition $P5\times Uo1$, table I, line 6) or to the phase P14 when an external routing has to be performed out condition: $P5\times\overline{Uo1}$, table I, line 14). These operations have been described during the description of the phase diagram of FIG. 6.

In both types of routing, a path hunt of type R*h* leads either to a signal P12 (connection which may be established) or to a signal P13 meaning that the occupation table must be changed. This signal P13 is followed by a signal P1 (Table I, line 1) which controls at the time *t*1 the advance of the selector KG to the position G2 and, at the time *t*2, the reading of the line Q1 of the memory MF. If the flip-flop F*x* is in the 1 state after the transfer controlled by the signal E1, this means that one is in one of the states Q*a* or Q*b* (see Table III). This information is thus sufficient for defining the term between brackets of the function $T2=(Qa+Qb)\times L1\times L2$ and the line Q2 is not read. The condition P1×G2 controls, at the next cycle, the shifting to the phase P4 (see Table III, line 4), this

TABLE IV

| Table ↓ | Selector KG ↓ | P1<br>Po(A1+A2)+P13 | P2<br>P1×G1 | P3<br>P1×G3 | P4<br>P2×G1+P1×G2 | P5<br>P4×t5 |
|---|---|---|---|---|---|---|
| Σ(T1) | G1 | Q1 | Q2 | ----------- | L1 | L2 |
| Σ(T2) | G2 | Q1 | ----------- | ----------- | L1 | L2 |
| Σ(T3) | G3 | Q1 | ----------- | Q2 | ----------- | |
| Transfer signal | | E1 | E0 | E1 | E0 | E0 |

The Table IV sums up the different operations for calculating occupation tables. The two first left-hand columns characterize the three tables and the corresponding signals delivered by the selector KG, FIG. 7.

Each of the following columns is assigned to information read in the memory MF under the control of the phase signals P1 to P5, the elaboration conditions of which are written immediately below. Last, the lowest line shows the transfer signal from the register RP to the register RF for each of these phases.

The logical condition $Po(A1+A2)$, which characterizes the fact that a routing request has just been received from the circuit CNP, controls the shifting to phase P1 (Table I, line 1). The selector KG is set to the position G*o*, in *t*1, then to the position G1 in *t*1 of the phase P1.

At time *t*2 of this phase P1, the line Q1 of the memory is read, and its contents are written in the register RP and then transferred, in *t*3, into the register RF under the control of the signal E1. A flip-flop RF*x* of this register sets then to the 1 state if the trunk F*x* is in one of the occupation states Q*a* or Q*b*.

signal controlling—as previously—the reading of the line L1. It is followed by a signal P5 which controls the reading of the line L2. Both these information are transferred in the register RF under the control of signals E*o* (see Table IV) and, in the same way as during the setting up of the table Σ(T1), the flip-flop F*x* remains in the 1 state only if each one of the logical variables Q1, L1, L2 presents the value 1.

The elaboration of the next table Σ(T3) is started by a new signal p13 which can appear only for the logical condition $Ga=G1+G2\times K$ (circuit BG, FIG. 3) which is followed by the phase signals P1 and P3 which enable to calculate the function $T3=\overline{Qx}=Qa+Qb+Qc$ under the control of signals E1.

2.3 PROCESSING OF THE INTERNAL CALLS

The performance of a path hunt of the type R*h* under the control of phase signals P6 to P11 will now be described. As it may be seen, referring to the diagram of phase distributor (FIG. 5) one shifts to the phase P6 for an external routing (condition P14×H) as well as for an internal routing [condition $(P3+P5)\times Uo1$].

Nevertheless, in a first stage, a path hunt of type R*h* for an internal routing will be described, the circuits used being represented in FIG. 8. It will be reminded that this type of routing is characterized by the fact that the selector KU represented in FIG. 9 is in the position U*o*1.

FIG. 8 groups the following circuits:

- the circuit TX for storing the central exchanges codes. In this circuit are stored the codes CX*g* and CX*m* of the calling and of the called central exchanges involved in an internal routing operation,
- the central exchange exploration circuit SX controlling the searching for the central exchanges of type *v* and *w*,
- the circuit for detecting free internal paths comprising two groups of logical circuits FP1 and FP2. The circuit FP2 delivers a signal R when a free path of the type R*h*1, R*h*2 or R*h*3 has been found.

TABLE V

| | Operation | Logical equation |
|---|---|---|
| 1 | Writing of the codes CX*g* and CX*m* sent by the circuit CNP in the registers RX*g* and RX*m* | $PA \times t5$ |
| 2 | Decoding of the code CX*g* | $(P6+P7+P9)\times t2$ |
| 3 | Decoding of the code CX*m* | $(P6+P8+P11)\times t2$ |
| 4 | Transfer of the codes CX*g* and CX*m* to the circuit CNP when the path hunt is completed | $P12\times R$ |
| 5 | Advance signals for the counters KV and KV*o* | $(P7+P9)\times t1$ |
| 6 | Decoding of the code CV in a path hunt of the type R*h*2 or R*h*3 | $(P7+P9)\times t2$ |
| 7 | Decoding of the code CV for checking the existence of a free path $Xv/Xm$ (phase P8) or $Xw/Xm$ (phase P10) | $(P8+P10)\times t2$ |
| 8 | Advance signals for the counters KW and KW*o* | $P10\times t1$ |
| 9 | Path hunt of type R*h*3 | $P10\times t2$ |
| 10 | Decoding of the code CW for a path hunt of type R*h*3 and for the checking of the existence of a free path $Xw/Xm$ | $(P10+P11)\times t2$ |
| 11 | Re-setting to the $\underline{0}$ state of the flip-flop $R$ | $(P8+P10+P11)\times t1$ |

When the central processor receives a request for a path hunt in order to set up a connection between the subscribers connected to the central exchanges X*g* and X*m*, it transmits to the routing circuit an order A1, the codes CX*g* and CX*m* and a signal K1 in the case of a priority call. The logical condition P*a*×*t*5 controls the writing of the codes in the registers RX*g* and RX*m* of the circuit TX of the codes of the central exchanges TX of the signal K1 in the flip-flop K located in the circuit BG (FIG. 7).

It will be noted that the signal PA elaborated in the circuit VC of FIG. 5 characterizes the times P*o*(*t*4+*t*5) and P1(*t*1+*t*2) of a routing request (condition A1+A2).

A decoder DX*g*, DX*m*, is associated to each of these registers, and the code stored in the corresponding register is applied to it when the multiple AND circuit which connects them is activated. Each of these decoders comprises six output terminals corresponding to the six central exchanges X1 to X6 of the network, and which are referenced X*g*1 to X*g*6 and X*m*1 to X*m*6 respectively.

The central exchanges exploration circuit SX comprises two exploration circuits DV and DW of identical design. The circuit DV, for instance, comprises the six-position counters KV, KV*o*, the decoder DV with six output terminals V1 to V6, the decoder DV*o* which delivers a signal D when the code DV1 is stored in the counter KV*o*. The code stored in the counter KV is applied to the decoder DV when the multiple AND circuit which connects them is activated. It will be noted that the outputs V1 to V6 of this decoder correspond, during the path hunt, to the central exchanges X1 to X6.

The circuit controls the exploration of the six central exchanges of the network under the control of the advance signals (P7+Pq)×*t1* starting from a central exchange chosen at random. In fact, the counter KV receives only advance signals so that it may show, at the beginning of the exploration, any central exchange code. On the contrary, the counter KV*o* which advances at the same rate is cleared at the beginning of a routing operation (condition P*o*×*t*1) and its decoder DV*o* is so designed as to supply a signal D1 when it receives the sixth code (which means that all the central exchanges of the network have been explored). The Table V groups the logical conditions set into operation in the circuits of FIG. 8.

It will be noted that the decoder DV supplies signals only for the logical conditions of lines 6 and 7 of this table.

The exploration circuit DW delivers a signal D2 when all the central exchanges of the type W have been explored, the advance being carried out according to equation 8 of Table V (P10×*t*1) and the decoder DW supplying signals for the equations 9 and 10 of said table, viz. for the logical condition (P10+P11)Ξ¼⅓2.

The free path detection circuit FP (FIG. 8) comprises two groups of logical circuits FP1, FP2.

The circuit FP1 comprises six four-input OR circuits. Each of these circuits is assigned to one of the central exchanges X1 to X6 of the network, and it delivers, when activated, a signal bearing the same reference. One has thus : X1=X*g*1+X*m*1+V1+W1, this signal meaning that at least one of the decoders DX*g*, DX*m*, DV, DW, delivers a signal which characterizes the central exchange X1. It will be noted, by examining FIG. 8 and Table V (lines 2, 3, 6, 7, 10), that only two of these decoders may be simultaneously activated. The circuit FP2 comprises N′=15 AND circuits, the output terminals of which being applied to the 1 input terminal of the flip-flop R through an OR circuit. These AND circuits enable to establish the correspondence between a trunk F*x* and the central exchanges it connects by setting that the group of lines F1 connects the central exchanges X1 and X2, that the group of lines F2 connects the central exchanges X1 and X3, etc. and that the group of lines F15 connects the central exchanges X5 and X6. To this effect, each AND circuit comprises first, two input terminals connected to two different output terminals of the circuit FP1 in such a way as it corresponds to one of the $$N' = \frac{n(n-1)}{2}$$

possible combinations characterizing the N′ internal groups of lines of the network and, on second, a third input terminal F1, F2...F15 connected to the output terminals bearing the same reference in the register RF (FIG. 7). It is thus seen that one has:

R′=F1×X1×X2+...+F15×X5×X6.

A signal R′ appears thus, for instance, if two of the decoders of the circuits SX and TX deliver respectively signals on their output terminals corresponding to the central exchanges X1 and X2 and if the group of lines F1 is considered as utilizable in the occupation table shown in the register RF.

If the network is not completely interconnected, some of the AND circuits are never activated. This obviously presents no inconvenience at all and it is realized that it is preferable that all the AND circuits be present in order not to be compelled to modify the circuit if new trunks are installed.

Before describing the performance of a path hunt, some logical conditions should be described, as follows:

1. Conditions G*a*=G1+G2×K and G*b*=G2×$\overline{K}$+G3 (circuit BG, FIG. 7).

The condition G*a* means that an occupation table may still be set up, the table Σ(T2) for G1 or the table Σ(T3) for G2.

The condition G*b* means that all the usable tables have been set up.

2. Conditions S1=$\overline{R}$×D1 and S2=$\overline{R}$×D1×D2.

The condition S1 means that a complete exploration of the central exchanges of the type *v* has been carried out without finding a connection which may be used.

The condition S2 means that all the possible combinations of the central exchanges *v* and *w* have been explored without finding a usable connection.

Therefore, for an internal routing:

the condition (S1+S2)×G*a* means that one must change the table Σ(T), the condition (S1+S2)×G*b* means that no free path has been found and that the call is lost.

As it has just been seen, an occupation table is calculated at the end of one of the phases P3 or P5 and one has, in the case of an internal path hunt: P'6=(P3+P5)×U*o*1, this signal controlling the shifting to phase P6 at the beginning of the next cycle. The phase signals P6 to P11 control the path hunt with a given occupation table, this hunt being carried out in the following order:

Phase P6: path hunt of type R*h*1 (direct path between the central exchanges X*g* and X*m*), Phases P7 and P8: path hunt of type R*h*2 (path passing through an intermediate central exchange), Phases P9, P10, P11: path hunt of type R*h*3 (path passing through two intermediate central exchanges).

All the logical conditions which summarize the operation of these different phases are detailed in the Tables II, VI, VII, and are grouped in the Table I. It will be noted that, in this last Table, some of these conditions comprise an additional term U*o*1 characterizing the fact that an internal connection has to be set up. This term has been omitted in the Tables VI and VII in order to simplify the writing.

The first path huntings are carried out by using the table Σ(T1). If it does not enable to find a free path, the same operations are resumed by using the table Σ(T2) then, eventually, by using the table Σ(T3).

2.3.1 PATH HUNT OF TYPE R*h*1

It is seen, by examining the Table V, lines 2 and 3, that only the decoders DX*g* and DX*m* (FIG. 8) can deliver a signal during the phase P6. The circuit FP1 delivers then a signal on the outputs corresponding to the central exchanges X*g* and X*m*. If a direct path X*g*/X*m* exists by means of the trunk F*x*, and if this trunk is considered as usable, the condition F*x*×X*g*X*m* controls the activation of the corresponding AND circuit in the circuit FP2 and a signal R is elaborated. One has thus (Table I, line 12*a*):

P6×R=P'12*a*.

On the contrary, if one has the condition $\overline{R}$ either because no trunk lines F*x* exists or because this trunk is not usable, one has (Table I, line 7): P6×$\overline{R}$=P'7.

2.3.2 PATH HUNT OF TYPE R*h*2

At the beginning of the next cycle a path hunt of type R*h*2 is carried out under the control of phase signals P7 and P8:

phase P7: hunt for a free path X*g*/X*v*, phase P8: checking of the existence of a free path X*v*/X*m*.

By examining the Table V, lines 2, 5 and 6, it is seen that the decoder DX*g* receives signals in P7, that the decoder DV receives signals in P7, P8, that the decoder DX*m* receives signals in P8 and that the counters KV and KV*o* advance by one position in P7.

The signals used during this hunt are the signal R or $\overline{R}$ already defined and the signal $\overline{D1}$ or D1, the signal $\overline{D1}$ meaning that all the central exchanges X1, X2...X6 have not been explored in the hunt for a central exchange X*v*. Table II gives the different logical conditions which may be set up during a phase P7 by assuming S1=$\overline{R}$×D1. One has thus:

line 1: shifts to the next phase P8 if the following condition has been fulfilled: R=F*x*×X*g*×X*v* (circuit FP2, FIG. 8);

line 2: remains in phase P7 if one has simultaneously the signals $\overline{R}$ and $\overline{D1}$ so that the exploration of the central exchanges is resumed;

line 3: shifts to the phase P13 when the condition S1××G*a* is fulfilled, this characterizing the fact that all the central exchanges have been explored, without being able to set up a path between the central exchange X*g* and any other central exchange of the network, but that it is still possible to use another occupation table. One shifts then to phase P1 at the beginning of the next cycle.

line 4: shifts to the phase P12*b* for the condition S1×G*b* characterizing the fact that no path at all has been found, using the last occupation table.

In the case where the shift is to the phase P8, the decoders DX*v* and DX*m* deliver signals, respectively, on their outputs X*v* and X*m*, and the Table VI groups the different possible cases. Thus:

line 1: shifts to the phase P12*a* if the connection X*v*/X*m* exists, and is usable.

lines 2 and 3: when such a connection does not exist or is not usable, one shifts in P7 or in P9 according to whether the condition $\overline{R}$ or $\overline{D1}$ or the condition S1=$\overline{R}$×D1 is fulfilled.

TABLE VI

| | Localization in the Table I | Logical conditions | Advance signal |
|---|---|---|---|
| Line: | | | |
| 1 | Line 12a, column B | $P8\times R$ | P'12a. |
| 2 | Line 7, column B | $P8\times\overline{R}\times\overline{D1}$ | P'7. |
| 3 | Line 9, column B | $P8\times S1$ ($S1=\overline{R}\times D1$) | P'9. |

2.3.3 PATH HUNT OF TYPE R*h*3

In this last case, a path hunt of type R*h*3 is carried out which comprises the following phases:

phase P9: hunt for a free path X*g*/X*V*, phase P10: hunt for a free path X*v*/X*w*, phase P11: checking of the existence of a free path X*w*/X*m*.

These signals control the following operations in the circuits SX and TX (FIG. 8):

a. application of signals to the decoder DX*g* in P9 and to the decoder DX*m* in P11 (Table V, lines 2 and 3);

b. advance of the counter KV in P9 and of the counter KW in P10 (Table V, lines 5 and 8);

c. application of signals to the decoder DV in P9, P10 and to the decoder DW in P10, P11 (Table V, lines 7 and 10).

The Table VII groups the different possible cases.

The phase P9 is similar to the phase P7, the only difference being the fact that the logical conditions of the lines 1 and 2 control the shifting, respectively, to phases P10 and P9.

In phases P10 and P11, the following cases are distinguished referring to Table VII:

a. lines 5 and 10—a signal controls the normal shifting to the next phase;

b. lines 6 and 14—all the central exchanges of type W have not been explored for a connection of type X*v*/X*w* and the exploration of these central exchanges is resumed by the phase signal P10;

c. lines 7 and 11—all the central exchanges of the type V have not been explored and the exploration is resumed by the phase P9;

d. lines 8 and 12—logical condition (S1+S2)×G*a:* no path has been found at all, but the hunt may be resumed with a table Σ(T) of higher index. Shift is then to the phase P13.

e. lines 9 and 13—logical condition (S1+S2)×G*b:* all the Tables Σ(T) have been tried, without result, and shift is to the phase P12*b* (lost call).

TABLE VII

| Line | Localized in the Table I | Logical conditions | Advance signal |
|---|---|---|---|
| 1 | Line 10, column B | $P9\times R$ | P'10. |
| 2 | Line 2, column A | $P9\times\overline{R}\times\overline{D1}$ | P'9. |
| 3 | Line 13, column B | $P9\times S1\times Ga$ | P'13. |
| 4 | Line 12b, column B | $P9\times S1\times Gb$ | P'12b. |
| 5 | Line 11, column B | $P10\times R$ | P'11. |
| 6 | Line 10, column A | $P10\times\overline{R}\times\overline{D2}$ | P'10. |
| 7 | Line 9, column B | $P10\times\overline{R}\times\overline{D1}\times D2$ | P'9. |
| 8 | Line 13, column B | $P10\times S2\times Ga$ | P'13. |
| 9 | Line 12b, column B | $P10\times S2\times Gb$ | P'12b. |
| 10 | Line 12a, column B | $P11\times R$ | P'12a. |
| 11 | Line 9, column B | $P11\times\overline{R}\times\overline{D1}\times D2$ | P'9. |
| 12 | Line 13, column B | $P11\times S2\times Ga$ | P'13. |
| 13 | Line 12b, column B | $P11\times S2\times Gb$ | P'12b. |
| 14 | | $P11\times\overline{R}\times\overline{D2}$ | P'10. |
| | | $(S1=\overline{R}\times D1)$ | |
| | | $(S2=\overline{R}\times D1\times D2)$ | |

2.4 PROCESSING OF THE OUTGOING CALLS

As it has been seen during the study of the routing procedure for an outgoing call, search is by using the Table Σ(T1) then—as the case may be—the following Tables, to set up a connection X*g*/.../X*s*/.../Y*m*; X*g*, X*s*, X*m* designating respectively the originating central exchange, an outgoing central exchange of the network X and the terminating central exchange belonging to the network Y. A translator associated to the circuit CNP of the network X gives, for each central exchange of the network Y, three outgoing central exchange codes directly connected to said network which enable to set up the connection X*s*/.../Y*m* through paths of type R*v*1, R*v*2, R*v*3, such as R*v*1 is the shortest path X*s*/.../Y*m*, R*v*2 the path immediately longer X*s*/.../Y*m*, etc... The extraction of an outgoing central exchange code CX*s* is controlled by a phase signal P14.

To simplify the description, it will be assumed that the telephone system studied comprises only two networks X and Y, that the outgoing central exchanges of the network X are those referenced X1, X3, X5, and that they are connected to the network Y respectively by the outgoing trunks F*a*, F*b*, F*c*. These trunks are treated as internal trunks for the measuring and the coding of the occupation levels (circuits represented on FIG. 3 and described in chapter 1), as well as for the calculation of the occupation class (circuits represented in FIG. 7 and described in chapter 2.2).

The circuit used in the processing of the outgoing calls is represented on FIG. 9, and it comprises:

- the register RY*m* in which is written the code CY*m* received from the circuit CNP and its decoder DY*m* delivering a signal during phase P14;
- the selector KU having five positions U*o*1, U*o*2, U1, U2, U3; the last three positions characterizing respectively the fact that a path hunt of type R*v*1, R*v*2, R*v*3 is carried out. This selector receives an advance signal for the condition $Ua=PA\times\Phi^4_2\times t5+P14\times t1$. On the other hand it is set to position U*o* for the condition $Po\times t1+U'3$, the signal U'3 corresponding to a delayed signal P1×U3;
- the translator MY constituted by a semipermanent memory and which comprises six groups of addresses MY1 to MY6, corresponding respectively to the six central exchanges Y1 to Y6 of the network Y. Each group of addresses comprises three lines reserved to the codes of the outgoing exchanges of the network X giving paths of the type R*v*1, R*v*2, R*v*3. Each code read is transferred into the register RX*m* of FIG. 8 for the condition P14×*t*2. The selection of addresses in the translator MY is carried out, in the circuit SY, by the combination of the signal Y*m*, delivered by the decoder DY*m*, with the path signal U1, U2 or U3 given by the selector KU. Thus, if one has the signals Y*m* U2, the contents of the second line of the group of addresses MY*m* is transferred into the register RX*m*;
- the flip-flop H and its control circuits supplying the logical condition:

$$H=(Xm1\times Fa+Xm3\times Fb+Xm5\times Fc)\times\overline{Uo1}\times t3$$
$$\overline{H}=(P14+Po)\times t1.$$

The condition H means that, when the decoder DX*m* delivers—for instance—a signal on its output X*m*1, the outgoing trunk F*a*, associated to the central exchange X1 is usable.

When the circuit CNP receives a routing request in order to set up a connection between subscribers connected to the central exchanges X*g* and Y*m*, it transmits to the routing circuit an order A2, the codes CX*g* and CY*m* of these central exchanges and, eventually, a signal K1 meaning that the call has priority.

The logical condition P*a*×A2×*t*5 controls the following operations:

- writing of the code CY*m* in the register RY*m* (FIG. 9);
- writing of the code CX*g* in the register RX*g* (FIG. 8) and of the signal K1 in the flip-flop K located in the circuit BG (FIG. 7);
- elaboration of an advance signal U*a* applied to the selector KU (FIG. 9) which shifts thus from position U*o*1 to position U*o*2. Thus, starting from time P1×*t*2 on, the condition $\overline{Uo1}$ characterizes an external routing. The signal PA (circuit VC, FIG. 5) appears during the taking up of a new routing request.

These operations are followed by the setting up of the occupation table Σ(T1) (condition $P'1=Po\times A2+T4$, Table I, line 1). At the end of this operation, one has $P'14=P5\times\overline{Uo1}$ and one shifts to phase P14 at the beginning of the next cycle. As it may be seen, on Table I, line 14, the phase P14 is set up also for a certain number of other logical conditions. This phase is reserved to the search of an outgoing trunk which may be usable and, if such a trunk exists, said phase is followed by a path hunt of type R*h*1, R*h*2 or R*h*3, between the originating central exchange and the outgoing central exchange to which is connected this trunk.

The study of this external routing operation may thus be divided into two parts:

A. SEARCH OF A USABLE OUTGOING TRUNK

When the table Σ(T1) is set up, and that one shifts to phase P14 as it has been seen hereabove, the selector KU (FIG. 9) shifts from the position U*o*2 to the position U1 (condition P14×*t*1) and, at time *t*2, the memory MY gives out the content of the first address of the group MY*m* (one of the groups MY1 to MY6) which is the code of the outgoing central exchange corresponding to the path R*v*1. This code is transferred into the register RX*m* and, in *t*3, a signal appears over the output X*m*1 of the decoder DX*m*, if it is assumed that this outgoing central exchange is the central exchange X1. The flip-flop H sets then to the 1 state if the outgoing group of lines F*a* connected to the central exchange is usable according to the occupation table Σ(T1).

The Table VIII states explicitly the different cases which may occur:

TABLE VIII

| Line | Localization in the Table I | Logical conditions | Next phase signal |
|---|---|---|---|
| 1 | Line 6, column B | $P14\times H$ | P'6. |
| 2 | Line 14, column A | $P14\times\overline{H}\times(U1+U2)$ | P'14. |
| 3 | Line 13, column B | $P14\times\overline{H}\times U3\times Ga$ | P'13. |
| 4 | Line 12b, column B | $P14\times\overline{H}\times U3\times Gb$ | P'12b. |

Line 1: the outgoing trunk F*a* being usable, the shift is to phase P6 which starts a path hunt of type R*h*1, R*h*2, R*h*3 in order to find a free path between central exchanges X*g* and X*s*. For this operation, the codes used as initial data are those placed in the registers RX*g* and RX*m*.

Line 2: the outgoing trunk $\overline{Fa}$ corresponding to one of the central exchanges giving the paths of the type R$v$1 or R$v$2, is not usable. The phase P14 is then looped in order to try a path of type R$v$2 or R$v$3.

Lines 3 and 4: the trunk F$a$ corresponding to the path of type R$v$3 is not usable. One has thus two cases similar to those appearing during a path hunt of type R$h$3.

Condition G$a$: shift is to phase P13 for calculating the next occupation table $\Sigma(T2)$ or $\Sigma(T3)$;

Condition G$b$: all the usable occupation tables have been tried without being able to find a free outgoing trunk. Thus, a signal P′12$b$ is given.

B. SEARCH OF A FREE PATH X$g$/X$s$

As it has just been seen, the condition P14×H (Table VIII, line 1) controls a path hunt of type R$h$. This latter is processed as it has been shown in Tables II, VI, VII, in all cases where one of the conditions $S1=\overline{R}\times D$ or $S2=\overline{R}\times D1\times D2$ does not appear.

The Table IX states explicitly the different cases which may occur when one of these conditions S1 or S2 appears, said condition characterizing the blocking of a path hunt of type R$h$. These cases may be grouped as follows:

a. all the possible outgoing central exchanges have not been tested (lines 2, 5 and 8): shift is to phase P14 for testing a new outgoing central exchange, b. all the possible outgoing exchanges have been tested, but the hunt may be resumed with table $\Sigma(T)$ of index immediately higher (lines 1, 4, 7). Shift is to phase P13 then to phase P1, c. all the possible outgoing central exchanges have been tested with the last usable occupation table (lines 3, 7, 9). One shifts then to phase P12$b$ and the call is lost.

TABLE IX

| | Localization in the column B of Table I | Logical conditions | Advance signal |
|---|---|---|---|
| Line: | | | |
| 1 | Line 13 | $(P7+P9)\times S1\times Ga\times U3$ | P′13. |
| 2 | Line 14 | $(P7+P9)\times S1\times Gb\times(U1+U2)$ | P′14. |
| 3 | Line 12b | $(P7+P9)\times S1\times Gb\times U3$ | P′12b. |
| 4 | Line 13 | $P10\times S2\times Ga\times U3$ | P′13. |
| 5 | Line 14 | $P10\times S2\times Gb\times(U1+U2)$ | P′14. |
| 6 | Line 12b | $P10\times S2\times Gb\times U3$ | P′12b. |
| 7 | Line 13 | $P11\times S2\times Ga\times U3$ | P′13. |
| 8 | Line 14 | $P11\times S2\times Gb\times(U1+U2)$ | P′14. |
| 9 | Line 12b | $P11\times S2\times Gb\times U3$ | P′12b. |

2.5 DATA TRANSFER BETWEEN THE CENTRAL PROCESSOR AND THE ROUTING CIRCUITS

To complete the description of the routing circuits according to the invention, the processes of data exchange between these circuits and the central processor will be briefly described:

2.5.1 RECEPTION OF DATA FROM THE CIRCUIT CNP

The routing circuits receive the following data from the central processor:

a routing request characterized by the reception of one of the signals A1 or A2. This request is taken up by the circuit RU as soon as one is in phase P$o$ (Table I, line 0) and the logical condition PA×$t$5 controls the transfer of the call identification data in the corresponding registers and flip-flops of the FIGS. 7, 8 and 9. These data are the codes CX$g$, CX$m$ for an internal routing, the codes CX$g$, CY$m$ for an external routing and a signal K1 if the call has priority. For the logical condition PA×$t$2, the routing circuit transmits to the circuit CNP the signal A$o$ (FIG. 8) meaning that this call has been taken up (the signal PA is supplied by the circuit VC, FIG. 5 and lasts from P$o$×$t$4 to P1×$t$2 inclusively).

a modification of the digits Q1 and Q2 of the occupation level codes characterized by the reception of the signal A3 sent by the circuit RA (FIGS. 3 and 7). This operation is taken up by the circuit RU as soon as the logical condition of the line 15, TAble I, is fulfilled:

$Po1=P0\times(\overline{A1+A2})\times A3$.

The end of operation is characterized by the condition P$o$2×$t$5 (FIG. 7, circuit BG) which controls the shifting to the condition $\overline{A3}$.

2.5.2 TRANSMISSION OF DATA TO THE CIRCUIT CNP

As it has been seen during the description of the time control circuit (FIG. 6) a signal P′12$a$ means that a free path has been found and the signal P′12$b$ means that the call is blocked and will be lost. In fact, these signals are combined into a same signal P12 and:

the condition P12×R means that the connection may be established, the condition $P12\times(\overline{R}\times\overline{H})$ means that the call is lost.

It is thus sufficient to transmit to the circuit CNP the state of the flip-flops R and H in order that this latter should be completely informed of the result of the routing. The identification data constituted by the codes CX$g$, CX$m$, CY$m$, CX$v$, CX$w$ and by the state of the flip-flop K are added to these signals. It will be noted that one or several of the three last codes may be missing according to the type of path of type R$h$ which has been found and to the type of routing (internal or external).

The transmission of this data to the circuit CNP is carried out under the control of a signal A7 received from this circuit and meaning that it is ready to receive them. This signal controls also the shifting to phase P$o$ (Table I, line zero).

While the principles of the above invention have been described in connection with specific embodiments and particular modifications thereof it is to be clearly understood that this description is made by way of example and not as a limitation of the scope of the invention.

We claim:

1. A centralized controller for directing the trunk supervision and path hunting within a multiexchange telephone network, wherein there are a plurality of possible paths from one exchange in said network to another exchange, means for supervising the occupation levels of the trunks within said exchange, means for storing information relative to the trunk occupation levels, means for storing information concerning priority levels of paths through said network, and still further means for storing information concerning busy hour priority of paths through said network, means for coding said information into a series of path directing codes and means for storing said coded path information, means for hunting for an idle path through said network from said one exchange to said other, hunt control means, said search control means responsive to said path directing codes to direct said hunt means to first test direct trunks having a code representative of the lowest occupation level with no priority assignments for hunting an idle path between said one and other exchanges, and means operative if no idle trunk is found for transferring subsequent testing of direct trunks to trunks having codes representative of higher occupation levels and means responsive to no free trunk having been found for trunks at the code levels tested for thereafter hunting indirect paths over more than one trunk coded at the lowest occupation level and means for continuing said hunt and transfer, until an idle path is selected or said continued hunting is terminated.

2. A controller, as claimed in claim 1, wherein said trunk supervising means comprises: means for delivering a trunk supervision program; means operating under the control of said program for interrogating the path storing means each time a connection is set up or released in order to obtain the code of the trunk set up or released and an indication whether said connection is set up or released, said path storing means being a memory comprising as many groups of addresses as there are trunks in the network, each of said groups comprising as many addresses as there are junctions in the trunk, each address containing, when a junction is bush, the code of the junction to which it is connected; and means operating under the control of said program for counting the number of busy junctions in each trunk and for storing said data at an address reserved for said trunk in a path storing means and for coding digitally said data into one of a number of said codes.

3. A controller as claimed in claim 2, wherein there is a centralized control unit controlled by path directing codes for processing an intranetwork call, means for providing a first group of phase signals for controlling the elaboration of a first low occupation level code, means for providing a second group of signals for controlling the hunt for paths, means for providing a third group of signals for controlling the elaboration of a higher occupation level code under the control of the first group of signals, and means for providing an end of hunt signal when either a free path has been found or the paths are blocked.

4. A controller as claimed in claim 3, wherein said trunk supervising means includes means for sending an indirect path signal following the elaboration of the low occupation level code, said indirect path signal controlling the choice of a first indirect path including an intermediate exchange and being followed by a search for a path to such last-mentioned exchange and, when no free path has been found, by a further indirect path signal for the choice of another intermediate exchange, and continuing said sequence of sending indirect path signals until all exchanges have been tested without any result, said program controlling then the transfer of said hunt control to a higher occupation level code.

5. In a controller as claimed in claim 1, wherein the trunk supervising means comprises a trunk occupation store having one address per trunk, each address comprising a first part for storing an occupation code and a second part for storing further data relative to said trunk; means for reading the information stored into said memory and for computing the occupation information of every trunk, said operations being controlled by signals of a first group, the occupation level codes being set up in an occupation register comprising as many bistable devices as there are trunks linked to the exchanges of the network; means for storing codes of originating and terminating exchanges in an intranetwork call or codes of the originating and outgoing exchanges in an internetwork call; and said search control means include two identical scanning circuits for cyclically scanning all of the exchanges of the network, each said scanning circuit having a counter advancing under the control of a scanning signal and delivering successively the codes of all the exchanges of the network; decoding means associated with each of the registers and counters, said means being selectively activated under the control of a signal from a group of signals so that only two decoders are activated simultaneously; and free path detection means delivering a free path signal when the information delivered by the two activated decoders correspond to a pair of exchanges connected by a trunk considered, in the occupation code, as being free.